(12) United States Patent
Sawada

(10) Patent No.: US 7,907,501 B2
(45) Date of Patent: Mar. 15, 2011

(54) OPTICAL DISC APPARATUS AND OPTICAL PICKUP UNIT

(75) Inventor: Michiyoshi Sawada, Ora-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 1052 days.

(21) Appl. No.: 11/608,724

(22) Filed: Dec. 8, 2006

(65) Prior Publication Data

US 2007/0133366 A1 Jun. 14, 2007

(30) Foreign Application Priority Data

Dec. 9, 2005 (JP) ................................. 2005-356627

(51) Int. Cl.
*G11B 7/00* (2006.01)
(52) U.S. Cl. .................................. 369/124.12; 369/120
(58) Field of Classification Search .......................... None
See application file for complete search history.

(56) References Cited

U.S. PATENT DOCUMENTS

| 5,321,679 | A  | * | 6/1994 | Horiguchi | ................... | 369/53.37 |
| 6,963,459 | B2 | * | 11/2005 | Sakai | ................ | 360/46 |
| 2004/0156277 | A1 | * | 8/2004 | Kuwayama | ................ | 369/44.29 |
| 2004/0179450 | A1 | * | 9/2004 | Mori et al. | .................. | 369/53.37 |

FOREIGN PATENT DOCUMENTS

| JP | 03-120621 | 5/1991 |
| JP | 04-134730 | 5/1992 |
| JP | 05-334709 | 12/1993 |
| JP | 07-225963 | 8/1995 |
| JP | 08-306060 | 11/1996 |
| JP | 08-335323 | 12/1996 |
| JP | 2002-032924 | 1/2002 |
| JP | 2002-298374 | 10/2002 |
| JP | 2004-127370 | 4/2004 |
| JP | 2005-071458 | 3/2005 |
| JP | 2007-012200 | 1/2007 |

OTHER PUBLICATIONS

State Intellectual Property Office of the P.R.C., Notification of Second Office Action for Chinese Application No. 200610164174.7, Mail Date Apr. 29, 2010. Japan Paten Office, Notification of an Office Action for Japanese Application No. 2005-356627, Mail Date Feb. 16, 2010.

* cited by examiner

*Primary Examiner* — Joseph Haley
(74) *Attorney, Agent, or Firm* — SoCal IP Law Group LLP; Steven C. Sereboff; John E. Gunther

(57) ABSTRACT

An optical disc apparatus comprising: an optical pickup unit having a semiconductor laser that radiates a laser light beam which is to be applied to an optical disc, a photo detector that has a plurality of light-receiving faces, which are disposed adjacent to each other, and each of which is disposed radially at an identical angle from a center of all of the plurality of light-receiving faces, and that, when the plurality of light-receiving faces receive a reflected light beam of the laser light beam applied to the optical disc, outputs photoelectric converted signals, each of which corresponds to a level of the reflected light beam at each of the plurality of light-receiving faces, a plurality of operational amplifiers that respectively output control signals for focus servo or track servo to the optical disc, based on the photoelectric converted signals, and an actuator that executes the focus servo or the track servo, based on the control signals; a driving unit that drives the actuator to execute the focus servo or the track servo, based on the control signals; a storage unit in which gain data is stored, the gain data being data for setting gains of the plurality of operational amplifiers; and a gain setting unit that adjusts gains of the plurality of operational amplifiers such that the gains have values equivalent to that the reflected light beam is evenly applied to the plurality of light-receiving faces, based on the gain data read from the storage unit.

7 Claims, 10 Drawing Sheets

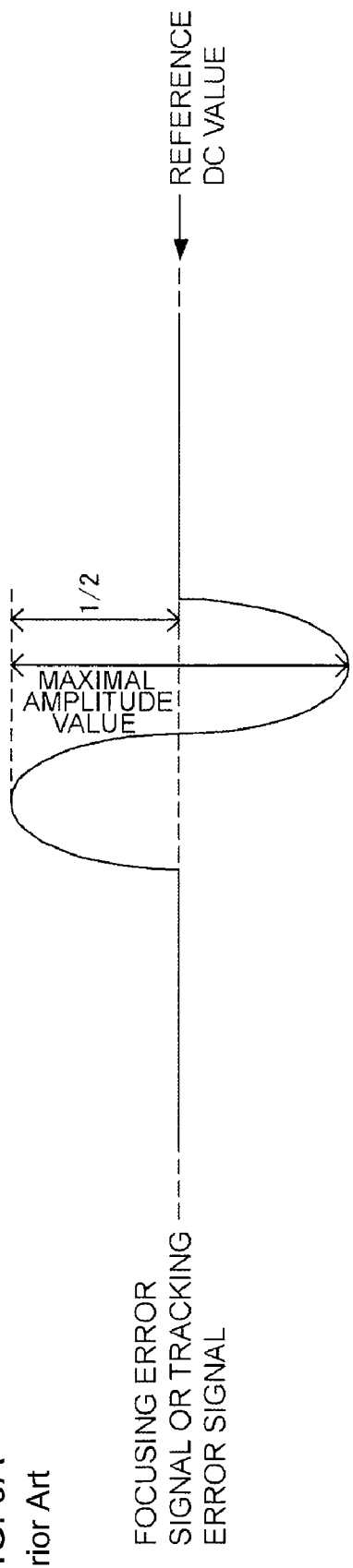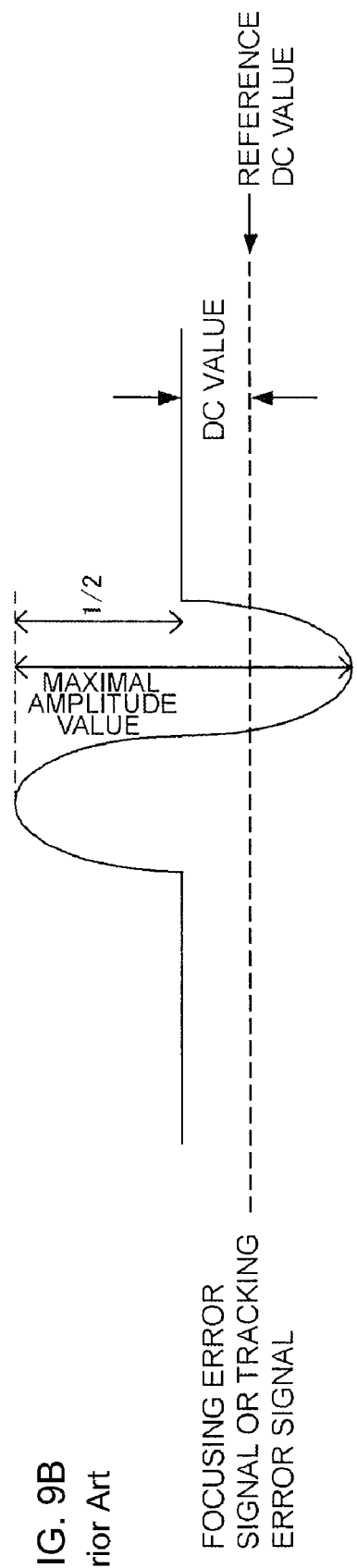

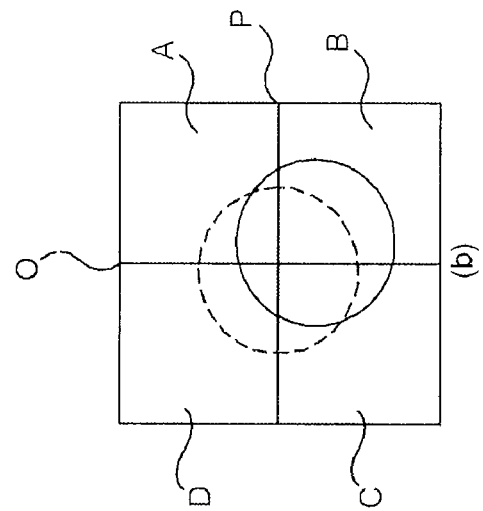
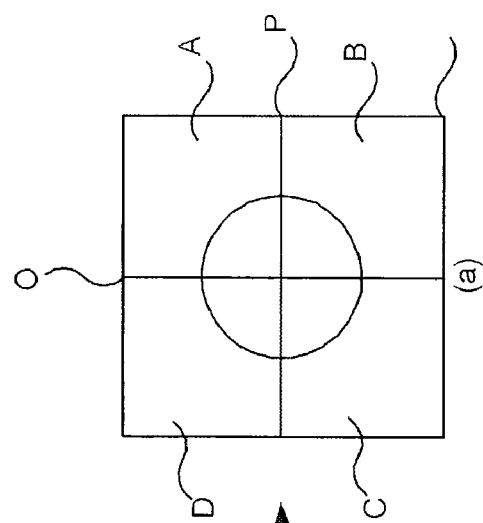
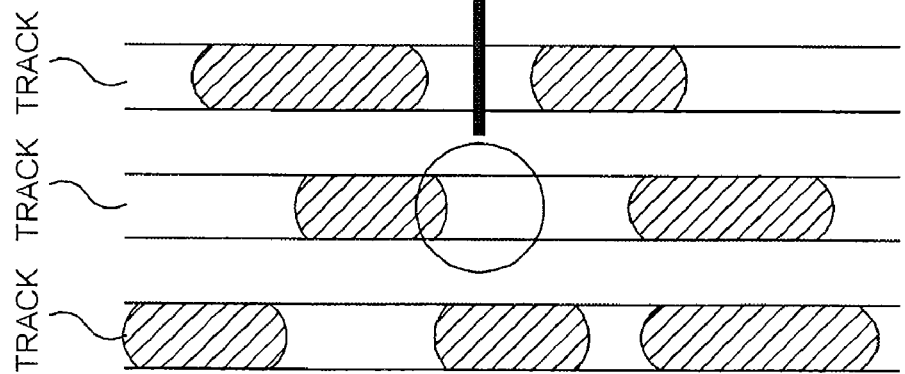
FIG. 10
Prior Art

OPTICAL DISC APPARATUS AND OPTICAL PICKUP UNIT

CROSS-REFERENCE TO RELATED APPLICATION

This application claims the benefit of priority to Japanese Patent Application No. 2005-356627, filed Dec. 9, 2005, of which full contents are incorporated herein by reference.

BACKGROUND OF THE INVENTION

1. Field of the Invention

The present invention relates to an optical disc apparatus and an optical pickup unit.

2. Description of the Related Art

Recently, optical discs (for example, a CD (Compact Disc), a DVD (Digital Versatile Disc)) are prevailing as recording media for recording/reproducing of information. With the prevalence of the optical discs, optical disc apparatuses for recording/reproducing of information to/from the optical discs are prevailing. An optical disc apparatus generally includes an optical pickup unit, an ASP (Analog Signal Processor), a DSP (Digital Signal Processor), a motor driver, etc. The optical pickup unit includes a semiconductor laser for radiating a laser light beam to an optical disc, a photo detector for receiving a reflected light beam of the laser light beam from the optical disc, etc.

The thus configured optical disc apparatus creates signals respectively for various types of servo control based on a photoelectric converted signal that corresponds to the level of the reflected light beam, outputted from the photo detector to radiate accurately the laser light beam to the optical disc. An example of this can be an optical disc apparatus that creates a focusing error signal and a tracking error signal each having a property that a reference DC value is equal to a half of the maximal amplitude value (hereinafter, "S-shaped property to the reference value", see FIG. 9A) to respectively execute a focusing servo for focusing a laser light beam on a signal layer of an optical disc and a trucking servo for causing the laser light beam to follow a track on the optical disc. The laser light beam is radiated accurately to the optical disc by executing control in the optical axis direction (focusing servo) and control in the radial direction (tracking servo) by driving an actuator of the optical pickup unit based on the focusing error signal and the tracking error signal. Therefore, the photoelectric converted signal outputted from the photo detector is the base for the focusing error signal and the tracking error signal in these types of servo control, and is required to be an accurate signal corresponding to the level of the reflected light beam.

However, the photoelectric converted signal outputted by the photo detector may include dispersion due to property of each photo detector and property of each optical pickup unit. Therefore, a focusing error signal or a tracking error signal or both influenced by the dispersion may be created. For example, as shown in FIG. 9B, a focusing error signal and a tracking error signal each having a property that a difference (offset) is generated between the reference DC value and a half of the maximal amplitude value may be created (variation of the balance of the S-shaped property to the reference DC value, displacement of the level, etc.). In this case, in an conventional optical disc apparatus, there are applied adjusting processes (balance adjustment, level adjustment, etc.) in which the offset generated in the focusing error signal and the tracking error signal is corrected by, for example, superimposing a DC value for correcting the difference between the reference DC value and the half of the maximal amplitude value, in a calculating process executed in the ASP that creates the focusing error signal and the tracking error signal.

The photo detector is mounted being positioned at high precision on an optical housing of the optical pickup unit to output an accurate photoelectric converted signal that corresponds to the radiation state of the laser light beam to the optical disc. Referring to FIG. 10, the positioning of the photo detector will be described below in detail. The photo detector has, for example, four light-receiving faces A to D formed by dividing an entire light-receiving face to receive the reflected light beam from the optical disc. Dividing lines "O" and "P" that divide the entire light-receiving face into the light-receiving faces A to D as above are provided such that the lines O and P crosses each other at a right angle and each form an angle of approximately 45 degrees with the direction of astigmatism generated when an astigmatism method, a differential astigmatism method, etc., are employed for the focusing servo. The direction of the dividing line "P" is provided such that this direction indicates the direction of a tangent line of a track when a push-pull method, a differential push-pull method, a 3-beam method, etc., are employed for the tracking servo.

The photo detector having such four light-receiving faces A to D is mounted on the optical housing being positioned such that, for example, when a laser light beam is radiated accurately to an optical disc, a reflected light beam of the laser light beam is radiated approximately evenly to the light-receiving faces A to D (see a portion (a) of FIG. 10). That is, when the laser light beam is radiated accurately to the optical disc, the photo detector is positioned such that the intersection of the dividing lines O and P and the center of the reflected light beam approximately coincide with each other. An accurate focusing error signal can be created by positioning the photo detector in this manner and executing a calculating process of {(the photoelectric converted signal corresponding to the level of the reflected light beam at the light-receiving face A)+(the photoelectric converted signal corresponding to the level of the reflected light beam at the light-receiving face C)}−{(the photoelectric converted signal corresponding to the level of the reflected light beam at the light-receiving face B)+(the photoelectric converted signal corresponding to the level of the reflected light beam at the light-receiving face D)}. An accurate tracking error signal can be created by executing a calculating process of { (the photoelectric converted signal corresponding to the level of the reflected light beam at the light-receiving face A)+(the photoelectric converted signal corresponding to the level of the reflected light beam at the light-receiving face D)}−{(the photoelectric converted signal corresponding to the level of the reflected light beam at the light-receiving face B)+(the photoelectric converted signal corresponding to the level of the reflected light beam at the light-receiving face C)}.

Such a conventional optical disc apparatus is disclosed in, for example, Japanese Patent Application Laid-Open Publication Nos. 2002-32924 and 2005-71458.

However, in mounting a photo detector on an optical housing, displacement of the photo detector from the position for the photo detector to be positioned may occur due to an error during the mounting, the remaining stress during the mounting, an error of the amount of an adhesive to be applied to fix the photo detector to the housing, etc. Otherwise, though the photo detector can be kept mounted at the position for the photo detector to be positioned for the time being after the mounting, displacement of the photo detector may occur due to variation over time (for example, variation of temperature, variation of humidity, an impact, vibration). Therefore, even though the laser light beam is accurately applied to the optical disc, the reflected light beam from the optical disc may be radiated as, for example, shown in a portion (b) of FIG. 10. That is, the reflected light beam may not be radiated approximately evenly to the four light-receiving faces A to D. The photo detector outputs a photoelectric converted signal in this radiation state and a focusing error signal and a tracking error signal may be created even when the types of servo control such as the focusing servo and the tracking servo are originally not necessary to be executed. Because the focusing servo and the tracking servo are executed respectively based on the focusing error signal and the tracking error signal, the laser light beam is not radiated accurately to the optical disc and recording/reproducing of information to/from the optical disc may be disabled. Otherwise, accurate recording/reproducing of information to/from the optical disc may not be executed.

A means of solving problems described above can be considered to be, for example, a method of executing, in the calculating process described above of the ASP, an adjusting process to the focusing error signal and the tracking error signal created when the displacement of the photo detector occurs. However, depending on the magnitude of the displacement of the photo detector, the displacement may exceed an adjustable range in the ASP. The adjusting process for the displacement of the photo detector has a limit to secure the performance to be originally satisfied by the ASP.

SUMMARY OF THE INVENTION

In order to solve the above problems, according to an aspect of the present invention there is provided an optical disc apparatus comprising: an optical pickup unit having a semiconductor laser that radiates a laser light beam which is to be applied to an optical disc, a photo detector that has a plurality of light-receiving faces, which are disposed adjacent to each other, and each of which is disposed radially at an identical radial angle from a center of all of the plurality of light-receiving faces, and that, when the plurality of light-receiving faces receive a reflected light beam of the laser light beam applied to the optical disc, outputs photoelectric converted signals, each of which corresponds to a level of the reflected light beam at each of the plurality of light-receiving faces, a plurality of operational amplifiers that respectively output control signals for focus servo or track servo to the optical disc, based on the photoelectric converted signals, and an actuator that executes the focus servo or the track servo, based on the control signals; a driving unit that drives the actuator to execute the focus servo or the track servo, based on the control signals; a storage unit in which gain data is stored, the gain data being data for setting gains of the plurality of operational amplifiers; and a gain setting unit that adjusts gains of the plurality of operational amplifiers such that the gains have values equivalent to that the reflected light beam is evenly applied to the plurality of light-receiving faces, based on the gain data read from the storage unit.

In order to solve the above problems, according to another aspect of the present invention there is provided an optical disc apparatus comprising: an optical pickup unit having a semiconductor laser that radiates a laser light beam which is to be applied to an optical disc, a photo detector that has a plurality of light-receiving faces, which are disposed adjacent to each other, and each of which is disposed radially at an identical radial angle from a center of all of the plurality of light-receiving faces, and that, when the plurality of light-receiving faces receive a reflected light beam of the laser light beam applied to the optical disc, outputs photoelectric converted signals, each of which corresponds to a level of the reflected light beam at each of the plurality of light-receiving faces; a plurality of operational amplifiers that respectively output control signals for focus servo or track servo to the optical disc, based on the photoelectric converted signals, and an actuator that executes the focus servo or the track servo, based on the control signals; a driving unit that drives the actuator to execute the focus servo or the track servo, based on the control signals; a first storage unit inside the optical pickup unit, in which initial gain data is stored, the initial gain data being data for setting initial gains of the plurality of operational amplifiers; a second storage unit outside the optical pickup unit, in which adjusting gain data is stored, the adjusting gain data being data for adjusting gains of the plurality of operational amplifiers; and a gain setting unit that adjusts gains of the plurality of operational amplifiers with use of the adjusting gain data read from the second storage unit, such that the gains have values equivalent to that the reflected light beam is evenly applied to the plurality of light-receiving faces, based on the control signals obtained when initial gains of the plurality of operational amplifiers are set with use of the initial gain data read from the first storage unit.

In order to solve the above problems, according to still another aspect of the present invention there is provided an optical disc apparatus comprising: an optical pickup unit having a semiconductor laser that radiates a laser light beam which is to be applied to an optical disc, a photo detector that has a plurality of light-receiving faces, which are disposed adjacent to each other, and each of which is disposed radially at an identical radial angle from a center of all of the plurality of light-receiving faces, and that, when the plurality of light-receiving faces receive a reflected light beam of the laser light beam applied to the optical disc, outputs photoelectric converted signals, each of which corresponds to a level of the reflected light beam at each of the plurality of light-receiving faces, and an actuator that executes focus servo or track servo to the optical disc; a plurality of operational amplifiers that respectively output a control signal for causing the actuator to execute the focus servo or the track servo, based on the photoelectric converted signals; a driving unit that drives the actuator to execute the focus servo or the track servo, based on the control signals; a storage unit in which gain data is stored, the gain data being data for setting gains of the plurality of operational amplifiers; and a gain setting unit that adjusts gains of the plurality of operational amplifiers such that the gains have values equivalent to that the reflected light beam is evenly applied to the plurality of light-receiving faces, based on the gain data read from the storage unit.

In order to solve the above problems, according to still another aspect of the present invention there is provided an optical pickup unit comprising: a semiconductor laser that radiates a laser light beam which is to be applied to an optical disc; a photo detector that has a plurality of light-receiving faces, which are disposed adjacent to each other, and each of which is disposed radially at an identical radial angle from a center of all of the plurality of light-receiving faces, and that, when the plurality of light-receiving faces receive a reflected light beam of the laser light beam applied to the optical disc, outputs photoelectric converted signals, each of which corresponds to a level of the reflected light beam at each of the plurality of light-receiving faces; a plurality of operational amplifiers that respectively output control signals for focus servo or track servo to the optical disc, based on the photoelectric converted signals; an actuator that executes the focus servo or the track servo, based on the control signals; and a storage unit in which initial gain data is stored, the initial gain data being data for adjusting gains of the plurality of operational amplifiers such that the gains have values equivalent to that the reflected light beam is evenly applied to the plurality of light-receiving faces, based on the control signals.

According to the present invention, the optical disc apparatus and the optical pickup unit can be provided that can output the accurate signals for the focusing servo and the tracking servo even when displacement of the photo detector has occurred. Other characteristics of the present invention will be clear from the attached drawings and the description herein.

BRIEF DESCRIPTION OF THE DRAWINGS

For more complete understanding of the present invention and the advantages thereof, read the description below referring to the attached drawings in which:

FIGS. 9A and 9B each show a focusing error signal or a tracking error signal; and FIG. 10 shows radiation of the laser light beam to the photo detector.

DETAILED DESCRIPTION OF THE INVENTION

First Embodiment

Entire Configuration of Optical Disc Apparatus 1

Figure 1:
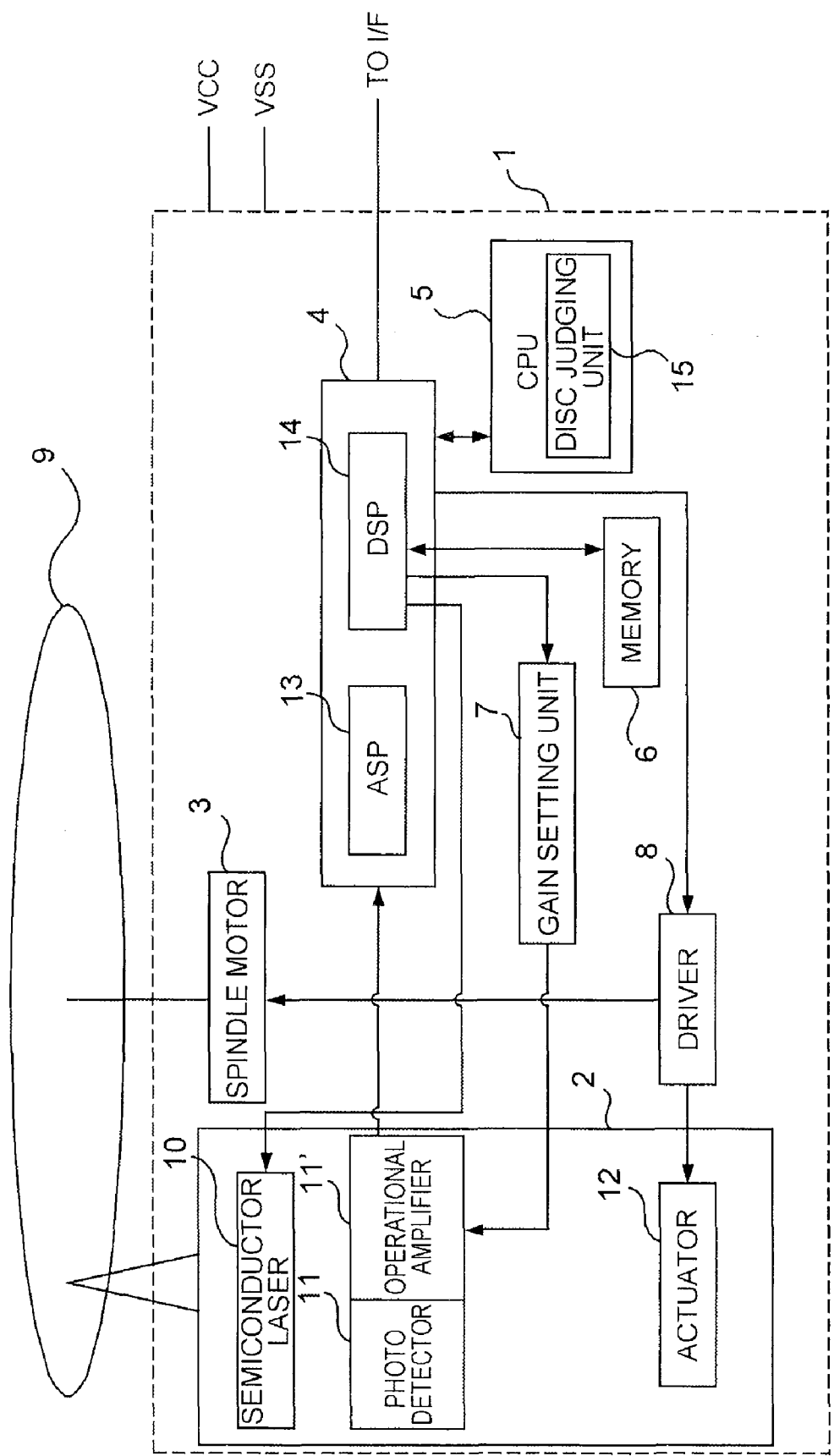
FIG. 1 is a block diagram of the entire configuration of an optical disc apparatus according to the present invention.
Figure 2:
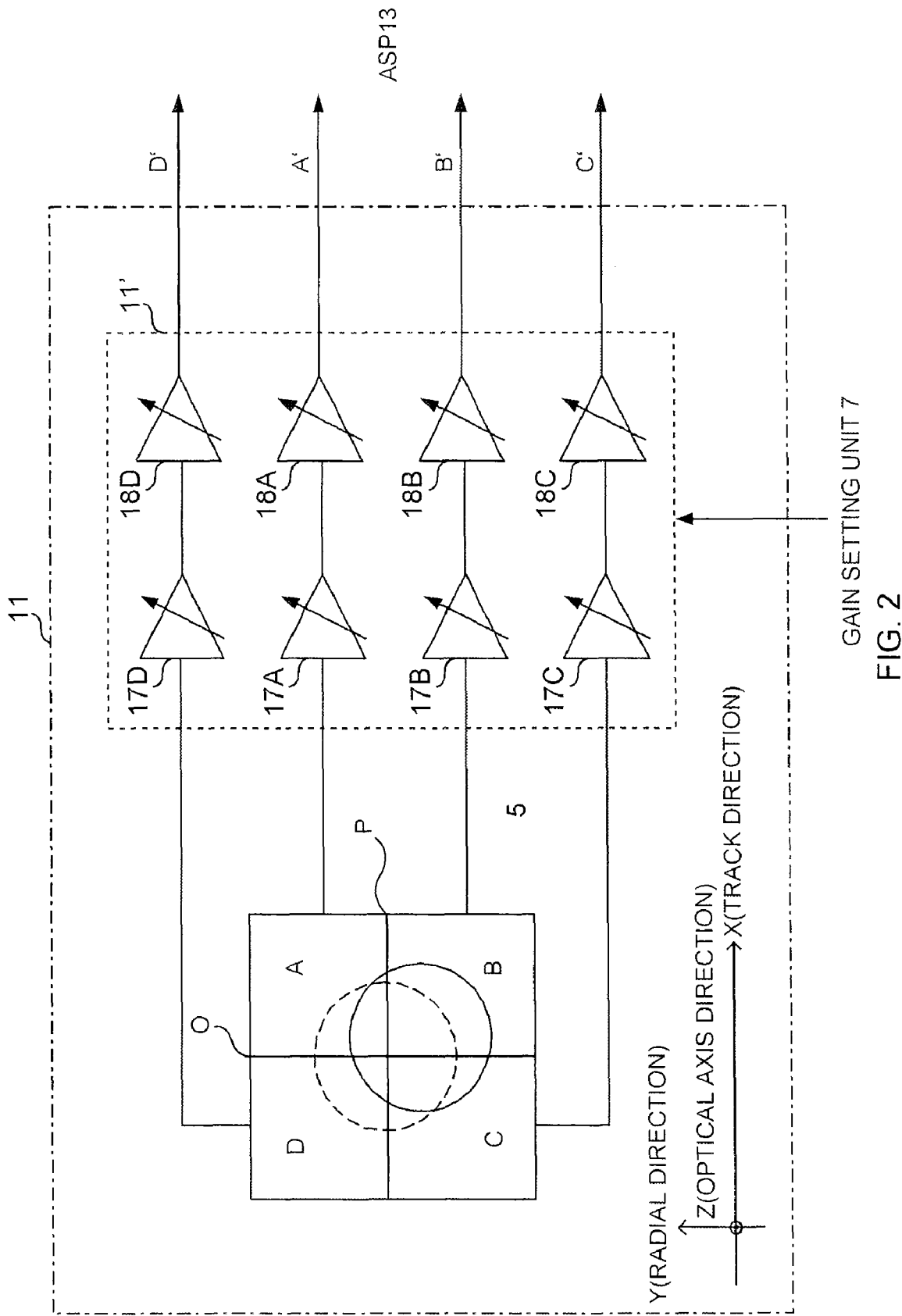
FIG. 2 is a circuit diagram of a photo detector.

Referring to FIGS. 1 and 2, the entire configuration of an optical disc apparatus 1 according to the present invention will be described. FIG. 1 is a functional block diagram of an example of the entire configuration of the optical disc apparatus 1 according to the present invention. FIG. 2 is a functional block diagram of an example of the configuration of a photo detector 11 shown in FIG. 1. The optical disc apparatus 1 shown below will be described as an optical disc apparatus that employs, for example, the astigmatism method as the focusing servo to an optical disc 9 and employs, for example, the push-pull method as the tracking servo.

Referring to FIG. 1, components of the optical disc apparatus 1 will be described. The optical disc apparatus 1 includes an optical pickup unit 2, a spindle motor 3, a signal processing unit 4, a CPU (Central Processing Unit) 5, a memory (storage unit) 6, a gain setting unit 7, and a driver (driving unit) 8.

The optical pickup unit 2 has a semiconductor laser 10, the photo detector 11, and an actuator 12. However, the optical pickup unit 2 has various optical systems that an ordinary optical pickup device has (a collimator lens, a beam splitter, an objective lens, an anamorphic lens, etc.), a front monitoring diode, etc., that are not shown because these components do not concern the subject matter of the present invention.

The semiconductor laser 10 radiates a laser light beam of a wavelength according to the standard of the optical disc 9 (when the optical disc 9 follows the standard for a CD: 780 to 790 nm, and follows the standard for a DVD: 650 to 660 nm) by being applied with a control voltage from a laser driving circuit (not shown) based on a signal from the signal processing unit 4. The intensity of the laser light beam that the semiconductor laser 10 radiates corresponds to the type of a medium of the optical disc 9 (for example, a CD-R (Recordable)/RW (ReWritable), a DVD-R/+RW, a DVD-RAM (Random Access Memory)) and is servo-controlled to adjust the intensity to an intensity that corresponds to recording/reproducing processes by the front monitoring diode's receiving the laser light beam.

The photo detector 11 receives a reflected light beam of the laser light beam from the optical disc 9. Referring to FIG. 2, the configuration of the photo detector 11 will be described in detail. The photo detector 11 has the four light-receiving faces A to D (the plurality of light-receiving faces) for receiving the reflected light beam, first operational amplifiers 17A to 17D (a plurality of operational amplifiers), and second operational amplifiers 18A to 18D. The dividing lines O and P that divide the entire light-receiving face into the light-receiving faces A to D are provided such that the lines O and P crosses each other at a right angle and each form an angle of approximately 45 degrees with the direction of astigmatism generated when the astigmatism method is employed for the focusing servo. The direction of the dividing line P is provided such that the direction indicates the direction of a tangent line of a track when a push-pull method is employed for the tracking servo. As a result, the light-receiving faces A to D are provided such that the faces are disposed adjacent to each other at the same radial angle from the center of the entire light-receiving face (the intersection of the dividing lines O and P).

The first operational amplifier 17A creates a photoelectric converted signal that corresponds to the level of the reflected light beam received at the light-receiving face A and outputs a control signal amplified with a gain set based on a signal from the gain setting unit 7, to the second operational amplifier 18A. The gain set for the first operational amplifier 17A, as will be described in detail for the DSP 14 hereafter, is set to be a value that corrects the displacement of the photo detector 11 in the track direction (hereinafter, "X direction") or the radial direction (hereinafter, "Y direction"), etc. Similarly, the first operational amplifier 17B is provided corresponding to the light-receiving face B, the first operational amplifier 17C is provided corresponding to the light-receiving face C, and the first operational amplifier 17D is provided corresponding to the light-receiving face D. These first operational amplifiers 17B to 17D each operate similarly to the first operational amplifier 17A and, therefore, description therefor is omitted. The detailed configuration of the first operational amplifiers 17A to 17D will be described later.

The second operational amplifier 18A outputs a control signal A' formed by amplifying the control signal from the first operational amplifier 17A with a gain set based on a signal from the gain setting unit 7, to the signal processing unit 4. The gain set for the second operational amplifier 18A is set to be a value that corresponds to the type of the medium of the optical disc 9. Similarly, the second operational amplifier 18B is provided corresponding to the first operational amplifier 17B, the second operational amplifier 18C is provided corresponding to the first operational amplifier 17C, and the second operational amplifier 18D is provided corresponding to the first operational amplifier 17D. These second operational amplifiers 18B to 18D each operate similarly to the second operational amplifier 18A and, therefore, description therefor is omitted. The photo detector 11 consisting of these components is structured by a semiconductor integrated circuit (so-called "PDIC" (Photo Detector Integrated Circuit) and is mounted being positioned on an optical housing of the optical pickup unit. Though the photo detector 11 described above is described herein as a photo detector that has the first operational amplifiers 17A to 17D and the second operational amplifiers 18A to 18D, the photo detector 11 is not intended to be limited to this. For example, the photo detector 11 excluding the first operational amplifiers 17A to 17D and the second operational amplifiers 18A to 18D, and the first operational amplifiers 17A to 17D and the second operational amplifiers 18A to 18D may be provided to the optical pickup unit 2 as separate integrated circuits.

Each component of the optical disc apparatus 1 will be described referring again to FIG. 1. The spindle motor 3 rotates according to, for example, a CAV (Constant Angular Velocity) scheme or a CLV (Constant Linear Velocity) scheme that corresponds to the standard of the optical disc 9 that causes the optical disc 9 to rotate. For example, the spindle motor 3 causes the optical disc 9 to rotate according to the CAV scheme by being applied from the driver 8 with a control voltage based on a pulse signal generated by the rotation of the spindle motor 3. Otherwise, the spindle motor 3 causes the optical disc 9 to rotate according to the CLV scheme by using a synchronous signal and a bit clock extracted from a signal recorded on the optical disc 9 at the signal processing unit 4.

The signal processing unit 4 has an ASP 13 and a DSP 14 (a gain setting unit and a writing unit, respectively). The ASP 13 creates an RF signal (radio frequency signal) from the control signals A' to D' from the second operational amplifiers 18A to 18D and controls the gains to the optimal level. The ASP 13 converts the RF signal into binary data by applying an equalizing process to the RF signal. The ASP 13 creates a focusing error signal $\{=(A'+C')-(B'+D')\}$ and a tracking error signal $\{=(A'+D')-(B'+C')\}$ based on the control signals A' to D' from the second operational amplifiers 18A to 18D. At this time, as shown in FIG. 9B, for example, the ASP 13 detects offsets of the focusing error signal and the tracking error signal generated relative to a reference DC value due to the displacement of the photo detector 11 and the characteristics of the photo detector 11, the characteristics of the optical pickup unit 2, etc. The ASP 13 calculates a DC value relative to the reference DC value to be superimposed on the focusing error signal and the tracking error signal to convert each of the focusing error signal and the tracking error signal with the generated offsets into a signal (see FIG. 9A) having an S-shaped property relative to the reference DC value. The ASP converts each of the focusing error signal and the tracking error signal into the signal having the S-shaped property by executing adjusting processes such as a balance adjustment and a level adjustment of the focusing error signal and the tracking error signal by superimposing the calculated DC value. The DC value calculated by the ASP 13 at this time is digitized by an analog/digital converting circuit (not shown) and is transmitted to the DSP 14.

The CPU 5 administers the various types of control of the optical disc apparatus 1 and judges the type of the medium of the optical disc 9 using a disc judging unit 15 that processes according to a known disc judging method. For example, the CPU 5 (disc judging unit 15) judges the type of the medium of the optical disc 9 by judging whether a peak value of the focusing error signal created by the ASP 13 exceeds a threshold value that is determined according to the type of the medium of the optical disc 9 based on the reflected light beam of the laser light beam applied to detect a signal layer of the optical disc 9 when the power source voltage is turned on (hereinafter, "focus search"). Otherwise, in the focus search, the CPU 5 (disc judging unit 15) judges the type of the medium of the optical disc 9 by judging whether the maximum of the varied amount per unit time of the focusing error signal created by the ASP 13 exceeds the reference value that is determined according to the type of the medium of the optical disc 9. The CPU 5 transmits the judgment result obtained by judging the type of the medium of the optical disc 9 to the signal processing unit 4.

When the DSP 14 detects the turning on of the power source voltage for the optical disc apparatus 1, the DSP 14 reads data to set the gains (initial gains) of the first operational amplifiers 17A to 17D stored in the memory 6 at this time (hereinafter, "fist gain data", that is, initial gain data) and transmits the data to the gain setting unit 7. An example of the first gain data can be provided as data taking the gain of the first operational amplifiers 17A to 17D as 0 dB when the optical disc apparatus 1 operates for the first time. Otherwise, respective manufacturers of the optical pickup unit 2 and the optical disc apparatus 1 may be different. In this case, the manufacturer of the optical pickup unit 2 may incorporate the optical pickup unit 2 into an optical disc apparatus having the same configuration as that of the optical disc apparatus 1 to detect the characteristics of the performance of the optical pickup unit 2 during the manufacturing process. Gains to be set respectively for the first operational amplifiers 17A to 17D respectively based on the control signals A' to D' detected at this time may be the first gain data. By the operation of the optical disc apparatus 1 described later in the embodiment, the first gain data is updated to data that is optimal to the positioning state of the photo detector 11 to the reflected light beam. During the focus search, to set the gains of the second operational amplifiers 18A to 18D to be, for example, 0 dB, the DSP 14 transmits data indicating the 0 dB (hereinafter, "initial data") to the gain setting unit 7. To set the gains of the second operational amplifiers 18A to 18D based on the judgment result that has judged the type of the medium of the optical disc 9 from the CPU 5, the DSP 14 reads the data corresponding to the judgment result (hereinafter, "second gain data") from the memory 6 and transmits this data to the gain setting unit 7.

The DSP 14 applies a decoding process according to the standard of the optical disc 9 to the binary-digitized signal from the ASP 13 and outputs the result to a host computer, etc., through an interface (I/F). For example, when the optical disc 9 is a CD, an EFM (Eight Fourteen Modulation) is employed as the modulation code and a CIRC (Cross Interleaved Read-Solomon Modulation) is employed as the error correction code in the CD standard. Therefore, the DSP 14 executes a decoding process based on these modulation code and error correction code. Otherwise, when the optical disc 9 is a DVD, an EFM-Plus (8-16) is employed as the modulation code and a RS (Reed-Solomon) Product-Code is employed as the error correction code in the DVD standard. Therefore, the DSP 14 executes a decoding process based on these modulation code and error correction code. As a result, information recorded on the optical disc 9 is reproduced.

The DSP 14 applies an encoding process according to the standard of the optical disc 9 to input data inputted through the interface. The encoding process of the DSP 14 is applied based on the modulation code and the error correction code according to the standard of the optical disc 9 described above. The DSP 14 outputs a signal applied with the encoding process to a light-strategy circuit (not shown). Recording of information is executed to the optical disc 9 by controlling a control voltage applied by the laser driving circuit to the semiconductor laser 10 due to processing of the light-strategy circuit.

The DSP 14 judges, for example, whether the percentage of the DC value to the maximal amplitudes (see, FIG. 9B) of the focusing error signal and the tracking error signal exceeds ±25(%) based on a digital signal indicating the DC value from the ASP 13. The value, ±25(%) indicates an example of the maximum of the DC value that enables the adjusting process for the offset without causing degradation of the performance (for example, decrease of the processing speed and degradation of the precision of the processing result) to execute processes other than the adjusting process (for example, the equalizing described above, conversion to binary data) when the ASP 13 executes the adjusting process to the offset. That is, in the embodiment, the description will be continued assuming that the performance to execute the processes other than the adjusting process by the ASP 13 may be degraded when the percentage of the DC value to the maximal amplitudes of the focusing error signal and the tracking error signal exceeds ±25(%). A value exceeding ±25(%) may be set when, for example, the ASP 13 has higher performance, and a value smaller than ±25(%) may be set when the load on the adjusting process for the offset by the ASP 13 is desired to be reduced.

When the DSP 14 judges that the percentage of the DC value to the maximal amplitudes of the focusing error signal and the tracking error signal exceeds ±25(%), the DSP 14 detects the control signals A' to D' from the second operational amplifiers 18A to 18D through an analog/digital converting circuit (not shown) and calculates amounts to respectively correct the gains of the first operational amplifiers 17A to 17D set based on the first gain data. Describing this in detail, the DSP 14 calculates $100*\{(A'+B')-(C'+D')\}$ and judges the presence or absence of displacement of the photo detector 11 (the light-receiving faces A to D) in the X direction (see FIG. 2). The DSP 14 calculates $100*\{(A'+D')-(B'+C')\}$ and judges the presence or absence of displacement of the photo detector 11 (the light-receiving faces A to D) in the Y direction (see FIG. 2). In these calculating processes, the multiplication of "100" is executed for detecting more accurately and more securely the displacement of the photo detector 11. When the DSP 14 judges the displacement in the X direction or the Y direction (the result of the calculation≠zero), the DSP 14 calculates the differences respectively between the control signals A' to D' and the average value of the control signals A' to D' ((A'+B'+C'+D')/4). The DSP 14 calculates correcting values for the gains of the first operational amplifiers 17A to 17D respectively corresponding to the differences. Describing this in detail, the DSP 14 calculates the gain for the first operational amplifier 17A to adjust the control signal A' to a control signal A' obtained when the reflected light beam is radiated evenly to the light-receiving faces A to D from the calculation result of (the average value−the control signal A'). Similarly, the DSP 14 calculates the gain for the first operational amplifier 17B to adjust the control signal B' to a control signal B' obtained when the reflected light beam is radiated evenly to the light-receiving faces A to D from the calculation result of (the average value−the control signal B'). Similarly, the DSP 14 calculates the gain for the first operational amplifier 17C to adjust the control signal C' to a control signal C' obtained when the reflected light beam is radiated evenly to the light-receiving faces A to D from the calculation result of (the average value−the control signal C'). Similarly, the DSP 14 calculates the gain for the first operational amplifier 17D to adjust the control signal D' to a control signal D' obtained when the reflected light beam is radiated evenly to the light-receiving faces A to D from the calculation result of (the average value−the control signal D'). As a result, the DSP 14 calculates the gains for the first operational amplifiers 17A to 17D that realizes an equivalent of that the reflected light beam is radiated evenly to the light-receiving faces A to D. That is to say, the calculated gains have values equivalent to that the reflected light beam is radiated evenly to the light-receiving faces A to D. These values indicate a state that the reflected light beam is radiated evenly to the light-receiving faces A to D. The DSP 14 transmits data indicating the correcting values of the gains for the first operational amplifiers 17A to 17D (hereinafter, "gain correcting data", that is, gain data) to the gain setting unit 7. The DSP 14 updates the first gain data stored in the memory 6 to update the gain correcting data to the first gain data. Though the apparatus is configured to update the gain correcting data as the first gain data in the embodiment, the configuration is not intended to be limited to this. For example, the memory 6 may be provided such that the gain correcting data is added at an address that is different from the address of the memory 6 storing the first gain data. In this case, the DSP 14 reads the gain correcting data from the address in the memory 6 at which the latest gain correcting data is stored, at the start of the next operation of the optical disc apparatus 1.

The memory 6 stores the first gain data. The memory 6 stores the second gain data that corresponds to the type of the medium of the optical disc 9 as descried above. The memory 6 consists of a non-volatile storage device, for example, such as an EEPROM (Electronically Erasable and Programmable Read Only Memory) including a flash ROM (Read Only Memory), that can be repeatedly written and read data by, for example, electrically erasing.

The gain setting unit 7 sets the gains indicated by the first gain data to the first operational amplifiers 17A to 17D based on the first gain data from the DSP 14 when the power source voltage is turned on (that is, energized). The gain setting unit 7 sets the gains (0 dB) indicated by the initial data to the second operational amplifiers 18A to 18D based on the initial data from the DSP 14. The gain setting unit 7 sets the gains indicated by the second gain data to the second operational amplifiers 18A to 18D based on the second gain data from the DSP 14. The gain setting unit 7 sets the gains indicated by the gain correcting data to the first operational amplifiers 17A to 17D based on the gain correcting data from the DSP 14.

The actuator 12 has a magnetic circuit unit such as a focusing driving coil (not shown) for the focusing servo, tracking driving coil (not shown) for tracking servo. The focusing servo and the tracking servo that respectively move the objective lens in the optical axis direction (hereinafter, "Z direction", see FIG. 2) or the Y direction are executed by applying the control voltage from the driver 8 based on the focusing error signal and the tracking error signal from the signal processing unit 4 to these controlling coils that the actuator 12 has. That is, the laser light beam from the optical pickup unit 2 can be focused on the signal layer of the optical disc 9 and can be caused to follow the track. Therefore, the laser light beam for recording/reproducing of information can be accurately radiated. Though not described in detail for not concerning the subject matter of the present invention, the actuator 12 executes the tilt control, the thread control, etc., that are ordinary servo control.

The optical disc apparatus 1 descried above has, for example, a disc tray (not shown) on which the optical disc 9 is placed, and placing and removing of the optical disc 9 is executed when the disc tray is pulled out from the optical disc apparatus 1. The disc tray is locked to prevent the disc tray from jumping out when the disc tray is pulled into a position at which the disc tray faces the optical pickup unit 2 in the optical disc apparatus 1. Description will be given below for an apparatus configured, for example, for the disc tray to be pulled out by releasing the lock by operating an eject mechanism.

Details of First Operational Amplifiers 17A to 17D

Figure 3:
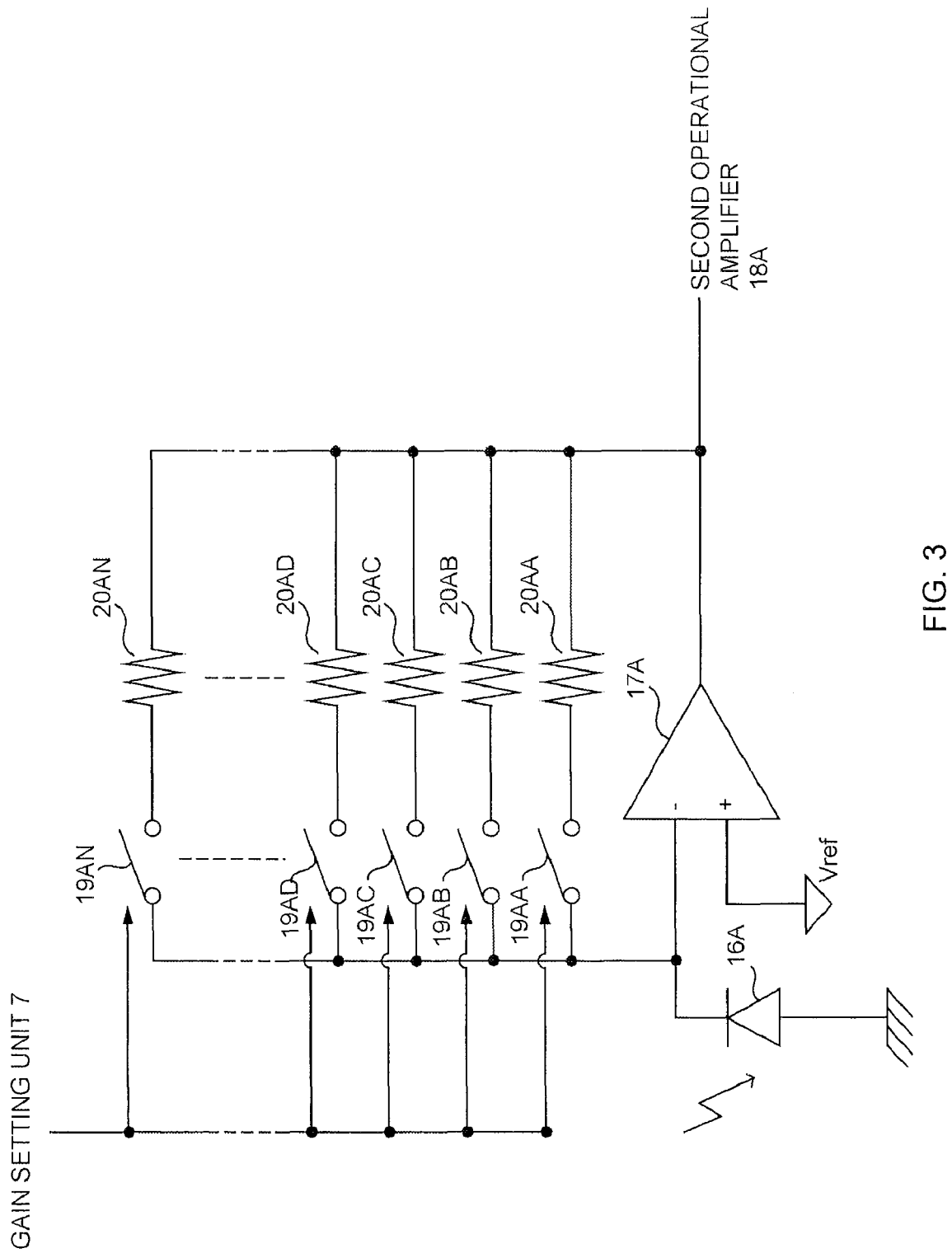
FIG. 3 is a flowchart of the operation of the optical disc apparatus according to the present invention.

The detailed configuration of the first operational amplifiers 17A to 17D will be described below referring to FIG. 3. FIG. 3 is a circuit diagram of the configuration of, for example, the first operational amplifier 17A in the first operational amplifiers 17A to 17D and, assuming that each of the first operational amplifiers 17B to 17D has the same configuration, the description thereof is omitted.

A photodiode 16A constitutes a portion of the light-receiving face A (see FIG. 2), and an anode thereof is grounded and the cathode thereof is connected with an inverting input terminal (negative terminal) of the first operational amplifier 17A. A current corresponding to the level of the reflected light beam received at the light-receiving face A flows through the photodiode 16A.

In the first operational amplifier 17A, a non-inverting input terminal (positive terminal) is connected with a reference voltage Vref and the inverting input terminal is connected with a cathode of the photodiode 16A and a terminal of each of switching circuits 19AA to 19AN, and an output terminal is connected with the second operational amplifier 18A and a terminal of each of feedback resistors 20AA to 20AN.

The switching circuits 19AA to 19AN are provided in a one-to-one correspondence to the feedback resistors 20AA to 20AN and are connected in parallel between the non-inverting input terminal and the output terminal together with the feedback resistors 20AA to 20AN. Each of the switching circuits 19AA to 19AN is selectively turned on based on a signal from the gain setting unit 7. Each of the switching circuits 19AA to 19AN consists of a transistor, is turned on by, for example, applying a high level indicated by the signal from the gain setting unit 7, to a control electrode thereof, and is turned off by applying a low level indicated by the signal from the gain setting unit 7, to a control electrode thereof.

In each of the feedback resistors 20AA to 20AN, an end thereof is connected with the output terminal and the other end thereof is connected with the other end of each of the switching circuit 19AA to 19AN. By selectively turning on each of the switching circuits 19AA to 19AN based on the signal from the gain setting unit 7, a resistance value determined from the resistance value of the feedback resistors 20AA to 20AN connected with the selectively turned on switching circuits 19AA to 19AN is set as the gain of the first operational amplifier 17A (hereinafter, "selective resistance value of the feedback resistors 20AA to 20AN". For example, assuming that the resistance value of the feedback resistor 20AA is 20AAR and the resistance value of the feedback resistor 20AC is 20ACR, the resistance value obtained when the switching circuits 19AA and 19AC are turned on= (**20AAR*20ACR/(20AAR+20ACR)). That is, by selectively turning on the switching circuits 19AA to 19AN by the gain setting unit 7 based on the first gain data and the gain correcting data, the gains indicated by the first gain data and the gain correcting data can be set to the first operational amplifier 17A. From the product of the current flowing through the photodiode 16A and the selective resistance value of the feedback resistors 20AA to 20AN, a voltage corresponding to the current (photoelectric converted signal) is generated. The first operational amplifier 17A outputs to the second operational amplifier 18A a control signal formed by amplifying the difference between the reference voltage Vref of the non-inverting input terminal and the photoelectric converted signal of the inverting input terminal by a gain determined by the selective resistance value of the feedback resistors 20AA to 20AN**.

The configuration of the first operational amplifier 17B that is the same as that of the first operational amplifier 17A described above will be described below, which is denoted as a photodiode 16B, switching circuits 19BA to 19BN, and feedback resistors 20BA to 20BN. The configuration of the first operational amplifier 17C will be described, which is denoted as a photodiode 16C, switching circuits 19CA to 19CN, and feedback resistors 20CA to 20CN. The configuration of the first operational amplifier 17D will be described, which is denoted as a photodiode 16D, switching circuits 19DA to 19DN, and feedback resistors 20DA to 20DN.

Operation of Optical Disc Apparatus 1

Figure 4:
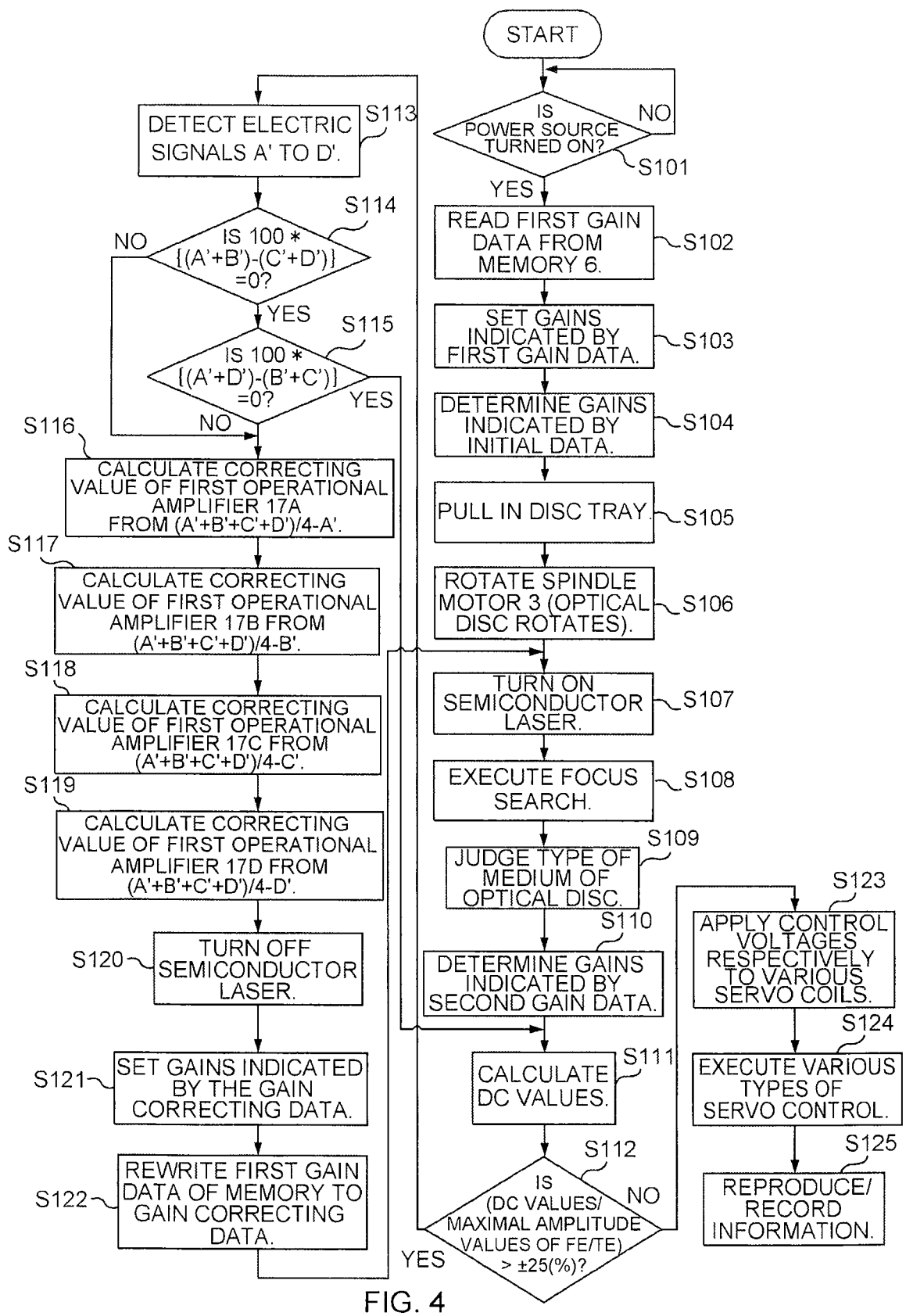
FIG. 4 shows a spotted light beam of a laser light beam and a reflected light beam at a four-divided photo detector.

Referring to FIGS. 1 to 4, operation of the optical disc apparatus according to the present invention will be described. FIG. 4 is a flowchart of an example of operation of the optical disc apparatus 1. In the embodiment, the description will be given assuming that displacement from the position at which the photo detector 11 is positioned is generated due to variation over time, etc., and the light-receiving faces A to D receive the reflected light beam from the optical disc 9 in such a way, for example, as shown in FIG. 2 (solid line).

When the DSP 14 detects turning on of the power source voltage of the optical disc apparatus 1 (S101•YES), the DSP 14 reads the first gain data from the memory 6 (S102) and transmits the data to the gain setting unit 7. The gain setting unit 7 transmits the signal to the switching circuits 19AA to 19AN to set the gain indicated by the first gain data to the first operational amplifier 17A. Similarly, the gain setting unit 7 transmits the signal to the switching circuits 19BA to 19BN to set the gain indicated by the first gain data to the first operational amplifier 17B. Similarly, the gain setting unit 7 transmits the signal to the switching circuits 19CA to 19CN to set the gain indicated by the first gain data to the first operational amplifier 17C. Similarly, the gain setting unit 7 transmits the signal to the switching circuits 19DA to 19DN to set the gain indicated by the first gain data to the first operational amplifier 17D. The switching circuits 19AA to 19AN selected based on the signal from the gain setting unit 7 are turned on. Similarly, the switching circuits 19BA to 19BN selected based on the signal from the gain setting unit 7 are turned on. Similarly, the switching circuits 19CA to 19CN selected based on the signal from the gain setting unit 7 are turned on. Similarly, the switching circuits 19DA to 19DN selected based on the signal from the gain setting unit 7 are turned on. As a result, the selective resistance value of the feedback resistors 20AA to 20AN connected with the switching circuits 19AA to 19AN selectively turned on is set as the gain of the first operational amplifier 17A. That is, the gain indicated by the first gain data is set to the first operational amplifier 17A. Similarly, the selective resistance value of the feedback resistors 20BA to 20BN connected with the switching circuits 19BA to 19BN selectively turned on is set as the gain of the first operational amplifier 17B. That is, the gain indicated by the first gain data is set to the first operational amplifier 17B. Similarly, the selective resistance value of the feedback resistors 20CA to 20CN connected with the switching circuits 19CA to 19CN selectively turned on is set as the gain of the first operational amplifier 17C. That is, the gain indicated by the first gain data is set to the first operational amplifier 17C. Similarly, the selective resistance value of the feedback resistors 20DA to 20DN connected with the switching circuits 19DA to 19DN selectively turned on is set as the gain of the first operational amplifier 17D. That is, the gain indicated by the first gain data is set to the first operational amplifier 17D (S103). The DSP 14 transmits the initial data to the gain setting unit 7 to set the gains for the second operational amplifiers 18A to 18D to be 0 dB. Based on the initial data, the gain setting unit 7 sets the gain (0 dB) indicated by the initial data to the second operational amplifiers 18A to 18D (S104).

When the CPU 5 detects, for example, the pulling in of the disc tray on which the optical disc 9 is placed (S105), the CPU 5 transmits a signal to the driver 8 to rotate the spindle motor 3. Based on the signal from the CPU 5, the driver 8 applies a control voltage to the spindle motor 3 to rotate the spindle motor in, for example, the CAV scheme. As a result, the spindle motor 3 rotates at a constant angular velocity and the optical disc 9 is rotated (S106). The CPU 5 transmits a signal to the signal processing unit 4 to cause the semiconductor laser 10 to radiate a laser light beam therefrom to execute the focus search. Based on the signal from the CPU 5, the signal processing unit 4 transmits a signal to the laser driving circuit. By applying the control voltage from the laser driving circuit to the semiconductor laser 10, the laser light beam from the semiconductor laser 10 is applied to the optical disc 9 (S107).

The reflected light beam of the laser light beam from the optical disc 9 is received by the light-receiving faces A to D of the photo detector 11. Currents respectively corresponding to the levels of the reflected light beam respectively flow through the photodiodes 16A to 16D respectively corresponding to the light-receiving faces A to D. As a result, the first operational amplifier 17A creates the photoelectric converted signal according to the product of the current flowing through the photodiode 16A and the selective resistance value of the feedback resistors 20AA to 20AN. The first operational amplifier 17A outputs the control signal from the output terminal thereof, the control signal being formed by amplifying the difference between the reference voltage Vref of the non-inverting input terminal and the photoelectric converted signal of the inverting input terminal by the gain that is set. The second operational amplifier 18A amplifies the control signal from the first operational amplifier 17A by the set gain, 0 dB, and outputs the control signal A' to the signal processing unit 4. Similarly, the first operational amplifier 17B creates the photoelectric converted signal according to the product of the current flowing through the photodiode 16B and the selective resistance value of the feedback resistors 20BA to 20BN. The first operational amplifier 17B outputs the control signal from the output terminal thereof formed by amplifying the difference between the reference voltage Vref of the non-inverting input terminal and the photoelectric converted signal of the inverting input terminal by the gain that is set. The second operational amplifier 18B amplifies the control signal from the first operational amplifier 17B by the set gain, 0 dB, and outputs the control signal B' to the signal processing unit 4. Similarly, the first operational amplifier 17C creates the photoelectric converted signal according to the product of the current flowing through the photodiode 16C and the selective resistance value of the feedback resistors 20CA to 20CN. The first operational amplifier 17C outputs the control signal from the output terminal thereof formed by amplifying the difference between the reference voltage Vref of the non-inverting input terminal and the photoelectric converted signal of the inverting input terminal by the gain that is set. The second operational amplifier 18C amplifies the control signal from the first operational amplifier 17C by the set gain, 0 dB, and outputs the control signal C' to the signal processing unit 4. Similarly, the first operational amplifier 17D creates the photoelectric converted signal according to the product of the current flowing through the photodiode 16D and the selective resistance value of the feedback resistors 20DA to 20DN. The first operational amplifier 17D outputs the control signal from the output terminal thereof formed by amplifying the difference between the reference voltage Vref of the non-inverting input terminal and the photoelectric converted signal of the inverting input terminal by the gain that is set. The second operational amplifier 18D amplifies the control signal from the first operational amplifier 17D by the set gain, 0 dB, and outputs the control signal D' to the signal processing unit 4. The ASP 13 creates the focusing error signal, $\{=(A'+C')-(B'+D')\}$ based on the control signals A' to D' respectively from the second operational amplifiers 18A to 18D. The CPU 5, for example, judges the type of the medium of the optical disc 9 by judging whether the peak value of the focusing error signal created by the ASP 13 exceeds the threshold value determined for each type of medium of the optical disc 9 (S108, S109). The CPU 5 transmits to the signal processing unit 4 the judgment result that judges the type of the medium of the optical disc 9.

The DSP 14 reads the second gain data corresponding to the judgment result from the memory 6 and transmits the data to the gain setting unit 7 to set the gains of the second operational amplifiers 18A to 18D based on the judgment result that judges the type of the medium of the optical disc 9 from the CPU 5. The gain setting unit 7 sets the gains indicated by the second gain data to the second operational amplifiers 18A to 18D based on the second gain data (S110). As a result, the gains corresponding to the type of the medium of the optical disc 9 are respectively set to the second operational amplifiers 18A to 18D. The second operational amplifier 18A amplifies the control signal from the first operational amplifier 17A by the gain indicated by the second gain data and outputs the control signal A' to the signal processing unit 4. Similarly, the second operational amplifier 18B amplifies the control signal from the first operational amplifier 17B by the gain indicated by the second gain data and outputs the control signal B' to the signal processing unit 4. Similarly, the second operational amplifier 18C amplifies the control signal from the first operational amplifier 17C by the gain indicated by the second gain data and outputs the control signal C' to the signal processing unit 4. Similarly, the second operational amplifier 18D amplifies the control signal from the first operational amplifier 17D by the gain indicated by the second gain data and outputs the control signal D' to the signal processing unit 4.

The ASP 13 creates the focusing error signal, $\{=(A'+C')-(B'+D')\}$ and the tracking error signal, $\{=(A'+D')-(B'+C')\}$ based on the control signals A' to D' from the second operational amplifiers 18A to 18D. At this time, the focusing error signal and the tracking error signal created by the ASP 13 are signals each having an offset generated to the reference DC value as shown in, for example, FIG. 9B because the light-receiving faces A to D receive the reflected light beam from the optical disc 9 in such a way as shown in FIG. 2 (solid line). The ASP 13 calculates DC values to be superimposed respectively to the focusing error signal and the tracking error signal to convert these signals respectively into a signal having the S-shaped property to the reference DC value (S111). The DC value calculated by the ASP 13 is digitized and transmitted to the DSP 14. The DSP 14 judges whether the percentage of the DC values to the maximal amplitude values (see FIG. 9B) of the focusing error signal and the tracking error signal exceeds ±25(%) based on the digital signal indicating the DC values from the ASP 13 (S112).

When the DSP 14 judges that the percentage of the DC values to the maximal amplitude values of the focusing error signal and the tracking error signal exceeds ±25(%) (S112•YES), the DSP 14 detects the control signals A' to D' from the second operational amplifiers 18A to 18D (S113). The DSP 14 calculates 100*{(A'+B')−(C'+D')} and judges the presence or absence of displacement of the photo detector 11 (light-receiving faces A to D) in the X direction (see FIG. 2) (S114). When the DSP 14 judges the presence of the displacement of the photo detector 11 (light-receiving faces A to D) in the X direction (S114•NO), the procedure is advanced to S116 described later. When the DSP 14 judges the absence of the displacement of the photo detector 11 (light-receiving faces A to D) in the X direction (S114•YES), the DSP 14 calculates 100*{(A'+D')−(B'+C')} and judges the presence or absence of displacement of the photo detector 11 (light-receiving faces A to D) in the Y direction (see FIG. 2) (S115). When the DSP 14 judges the presence of the displacement of the photo detector 11 (light-receiving faces A to D) in the Y direction (S115•NO), the DSP 14 calculates the average value, {(A'+B'+C'+D')/4} of the control signals A' to D'. The DSP 14 calculates a correcting value for the gain of the first operational amplifier 17A based on the difference between the average value and the control signal A' (S116). Similarly, the DSP 14 calculates a correcting value for the gain of the first operational amplifier 17B based on the difference between the average value and the control signal B' (S117). Similarly, the DSP 14 calculates a correcting value for the gain of the first operational amplifier 17C based on the difference between the average value and the control signal C' (S118). Similarly, the DSP 14 calculates a correcting value for the gain of the first operational amplifier 17D based on the difference between the average value and the control signal D' (S119). The DSP 14 creates a gain correcting data that indicates the correcting value for the gain of the first operational amplifier 17A to 17D. DSP 14 transmits a signal to the laser driving circuit to stop the radiation of the laser light beam from the semiconductor laser 10. By applying a control voltage (for example, 0[V]) from the laser driving circuit, the radiation of the laser light beam from the semiconductor laser 10 to the optical disc 9 is stopped (S120). The DSP 14 transmits the gain correcting data to the gain setting unit 7.

The gain setting unit 7 transmits a signal to the switching circuits 19AA to 19AN to set the gain indicated by the gain correcting data to the first operational amplifier 17A. Similarly, the gain setting unit 7 transmits a signal to the switching circuits 19BA to 19BN to set the gain indicated by the gain correcting data to the first operational amplifier 17B. Similarly, the gain setting unit 7 transmits a signal to the switching circuits 19CA to 19CN to set the gain indicated by the gain correcting data to the first operational amplifier 17C. Similarly, the gain setting unit 7 transmits a signal to the switching circuits 19DA to 19DN to set the gain indicated by the gain correcting data to the first operational amplifier 17D. The switching circuits 19AA to 19AN are turned on that are selected based on the signal from the gain setting unit 7. Similarly, the switching circuits 19BA to 19BN are turned on that are selected based on the signal from the gain setting unit 7. Similarly, the switching circuits 19CA to 19CN are turned on that are selected based on the signal from the gain setting unit 7. Similarly, the switching circuits 19DA to 19DN are turned on that are selected based on the signal from the gain setting unit 7. As a result, the selective resistance value of the feedback resistors 20AA to 20AN connected with the switching circuits 19AA to 19AN turned on selectively is set as the gain of the first operational amplifier 17A. That is, the gain indicated by the gain correcting data is set to the first operational amplifier 17A. Similarly, the selective resistance value of the feedback resistors 20BA to 20BN connected with the switching circuits 19BA to 19BN turned on selectively is set as the gain of the first operational amplifier 17B. That is, the gain indicated by the gain correcting data is set to the first operational amplifier 17B. Similarly, the selective resistance value of the feedback resistors 20CA to 20CN connected with the switching circuits 19CA to 19CN turned on selectively is set as the gain of the first operational amplifier 17C. That is, the gain indicated by the gain correcting data is set to the first operational amplifier 17C. Similarly, the selective resistance value of the feedback resistors 20DA to 20DN connected with the switching circuits 19DA to 19DN turned on selectively is set as the gain of the first operational amplifier 17D. That is, the gain indicated by the gain correcting data is set to the first operational amplifier 17D (S121). The DSP 14 updates the first gain data stored in the memory 6 to convert the gain correcting data into the first gain data (S122). The procedure is returned to S107 described above. As a result, the gains respectively for the first operational amplifiers 17A to 17D are set, such that the gains have values equivalent to that the light-receiving faces A to D receive the reflected light beam as indicated by a dotted line in FIG. 2, although the light-receiving faces A to D receive the actual reflected light beam as indicated by the solid line in FIG. 2. The control signals from the first operational amplifiers 17A to 17D to which the gains are set are outputted from the output terminals. As a result, the focusing error signal and the tracking error signal created by the ASP 13 are signals each having an S-shaped property to the reference DC value.

When the DSP 14 judges that the percentage of the DC values to the maximal amplitude values of the focusing error signal and the tracking error signal does not exceeds ±25(%) (S112•NO), the focusing error signal and the tracking error signal after the DC values are respectively superimposed thereto (however, the DC values are not superimposed when no offset is generated to the reference DC value) are transmitted to the driver 8. When the focusing error signal is a signal that indicates mis-focusing to the signal layer of the optical disc 9 or the tracking error signal is a signal that indicates mis-tracking to the track of the optical disc 9 (that is, when the focusing error signal or the tracking error signal or both is/are not zero), the driver 8 applies the control voltages respectively to the focusing driving coil and the tracking driving coil (S123). By driving the objective lens using the focusing driving coil and the tracking driving coil based on the control voltages, the objective lens is moved in the Z direction or the X direction and, therefore, the focusing servo and the tracking servo are executed (S124). As a result, the laser light beam is accurately applied to the optical disc 9 and reproducing/recording of information from/to the optical disc 9 are executed accurately (S125).

According to the above, the calculating process (the average value–the difference of each control signals A' to D') based on the control signals A' to D' is executed to correct the gains for the first operational amplifiers 17A to 17D, however, the process is not intended to be limited to the above. For example, a plurality of gain correcting data respectively indicating gains that have different values to be set respectively to the first operational amplifiers 17A to 17D may be stored in advance in the memory 6. Describing this in detail, when the DSP 14 judges that the percentage of the DC values to the maximal amplitude values of the focusing error signal and the tracking error signal exceeds ±25(%) (S112•YES), the DSP 14 reads one gain correcting data in the plurality of gain correcting data from the memory 6 and transmits the data to the gain setting unit 7. As a result, the gains indicated by the one gain correcting data are set to the first operational amplifiers 17A to 17D. The DSP 14 again judges whether the percentage of the DC values to the maximal amplitude values of the focusing error signal and the tracking error signal exceeds ±25(%) (S112). When the DSP 14 again judges that the percentage of the DC values to the maximal amplitude values of the focusing error signal and the tracking error signal exceeds ±25(%) (S112•YES), the DSP 14 reads one gain correcting data in the plurality of gain correcting data, that is different from the above one gain correcting data, from the memory 6 and transmits this data to the gain setting unit 7. In this manner, each of the plurality of gain correcting data stored in the memory 6 may be read sequentially and may be provided to be set as the gains for the first operational amplifiers 17A to 17D until the DSP 14 judges that the percentage of the DC values to the maximal amplitude values of the focusing error signal and the tracking error signal does not exceed ±25(%) (S112•NO). Otherwise, when all the gains indicated by the plurality of the gain correcting data are set as the gains for the first operational amplifiers 17A to 17D and the DSP 14 judges that the percentage of the DC values to the maximal amplitude values is minimal (or, that the percentage of the DC values to the maximal amplitude values is zero), the gains indicated by the gain correcting data for which the percentage of the DC values to the maximal amplitude value is minimal may be provided to be set as the gain for the first operational amplifiers 17A to 17D.

According to the above, when the DSP 14 judges that the percentage of the DC value to the maximal amplitude values of the focusing error signal and the tracking error signal exceeds ±25(%) (S112•YES), a process is executed to correct the gains for the first operational amplifiers 17A to 17D, however, the process is not intended to be limit to this. For example, when the processes at S114 and S115 are executed between S110 and S111 of FIG. 4 and, as a result, displacement of the photo detector 11 (the light-receiving faces A to D) in the X direction or the Y direction is judged (S114•NO, S115•NO), the process may be provided to execute the processes following S116. As a result, it is not necessary to judge whether the percentage of the DC values to the maximal amplitude values of the focusing error signal and the tracking error signal exceeds ±25(%) (S112) and, therefore, the processing load in the DSP 14 can be reduced.

According to the above, the description is given assuming that the astigmatism method is employed for the focusing servo, the push-pull method is employed for the tracking servo, and the laser light beam from the semiconductor laser 10 is not diffracted, however, the assumption is not intended to be limit to this. For example, when the differential astigmatism method is employed for the focusing servo and the differential push-pull method or the 3-beam method is employed for the tracking servo, a diffraction grating (not shown) may be provided that diffracts the laser light beam in the optical system of the optical pickup unit 2 and three photo detectors It may be provided to receive the reflected light beam of the zero-order diffracted light beam and the ±first-order light beam of the laser light beam after being diffracted by the diffraction grating. Four light-receiving faces A to D (or, two light-receiving faces to the reflected light beam of the ±first-order light beam) respectively to photo detectors 11 may be provided and a focusing error signal by the differential astigmatism method, etc., and a tracking error signal by the differential push-pull method, etc., may be created.

The configuration of the second operational amplifiers 18A to 18D in the above is omitted because the configuration does not concern the subject matter of the present invention. However, for example, the configuration may be the same as that of first operational amplifiers 17A to 17D as shown in FIG. 3. Gains corresponding to the type of the medium of the optical disc 9 may be set to the second operational amplifiers 18A to 18D by the closing of the switching circuits 19AA to 19AN based on the signal corresponding to the second gain data from the gain setting unit 7.

According to the above, the description is given describing that the first gain data for the first operational amplifiers 17A to 17D, the second gain data for the second operational amplifiers 18A to 18D, and the initial data are all stored in the memory 6. However, the storage is not intended to be limited to this. For example, the memory 6 may be used dedicatedly for storing the first gain data. As a result, for example, the memory 6 consists of an EEPROM, etc., to/from which data can be repeatedly written and read because updating of the first gain data to the gain correcting data is necessary. However, a ROM, etc., that stores the program data, etc., for the CPU 5 to execute processing may store the data because no updating of both of the second gain data and the initial data is necessary. That is, the storable capacity of the memory 6 can be reduced, and reduction of costs of the optical disc apparatus 1 and simplification of the circuit arrangement can be facilitated.

According to the embodiment described above, it becomes possible to adjust the gains for the first operational amplifiers 17A to 17D to values which are equivalent to that the reflected light beam is received evenly by the light-receiving faces A to D, based on the first gain data (or, the first gain data after the gain correcting data has been updated) read from the memory 6. As a result, the control signals from the first operational amplifiers 17A to 17D can be adjusted to the signals for which the influence of the displacement of the photo detector 11 (light-receiving faces A to D) is prevented (or reduced). The focus servo and the track servo can be successfully executed based on the control signals. The precision of the positioning of the photo detector 11 does not need to be strict and may be realized by rough adjustment during the manufacturing process of the optical pickup unit 2. Because, in the optical disc apparatus 1, the gains are obtained by a calculating process such that the control signals from the first operational amplifiers 17A to 17D are equated with the control signals obtained when the reflected light beam is radiated evenly to the light-receiving faces A to D. As a result, in the manufacture of the optical pickup unit 2, reduction of costs and reduction of the complexity of the positioning of the photo detector 11 can be facilitated.

By providing the memory 6 in the optical disc apparatus 1 outside the optical pickup unit 2, reduction of costs and an easier circuit arrangement for the optical pickup unit 2 can be facilitated.

The gain correcting data can be calculated based on the control signals A' to D' obtained when the gains indicated by the first gain data stored in advance in the memory 6 are set in the first operational amplifiers 17A to 17D. As a result, even when the first gain data stored in advance does not indicate the gains that can accurately correct the displacement of the photo detector 11 (the light receiving faces A to D), the gains for the first operational amplifiers 17A to 17D can be adjusted to values which are equivalent to that the reflected light beam is radiated evenly to the light-receiving faces A to D.

When the DSP 14 judges that the percentage of the DC values to the maximal amplitude values exceeds ±25(%), the gain correcting data can be calculated. As a result, when the focusing error signal and the tracking error signal can be corrected to the signals each having the S-shaped property by superimposing the DC values of the ASP 13 in the conventional technology, the processing load to calculate the gain correcting data can be reduced. Degradation of the performance of the ASP 13 can be prevented because the gain correcting data can be calculated without any process by the ASP 13 when the DSP 14 judges that the percentage of the DC values to the maximal amplitude values exceeds ±25(%).

Because the gain correcting data is stored in the memory 6, in the operation of the optical disc apparatus 1 executed next time, the latest gains are set in the first operational amplifiers 17A to 17D as in the state where the photo detector 11 (the light-receiving faces A to D) is displaced and, therefore, calculation of the gain correcting data may not need to be executed always. As a result, the processing load of the optical disc apparatus 1 can be reduced and recording/reproducing of information to/from the optical disc 9 can be executed quickly.

Because the gains for the first operational amplifiers 17A to 17D are set by detecting turning on of the power source voltage to the optical disc apparatus 1, excellent focusing error signal and tracking error signal can be created quickly. As a result, recording/reproducing of information to/from the optical disc 9 can be executed quickly.

Second Embodiment

Entire Configuration of Optical Disc Apparatus 23

Figure 5:
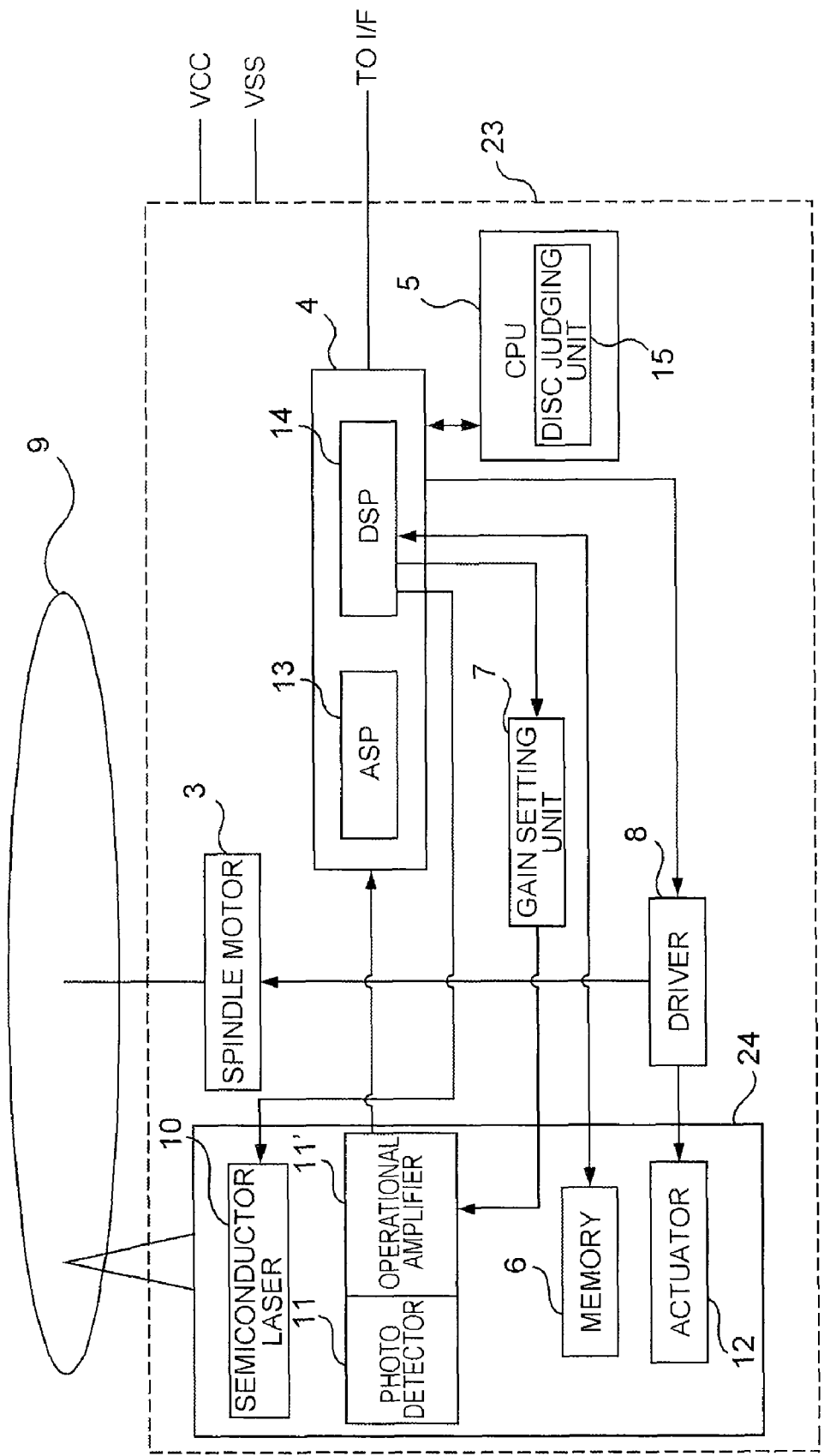
FIG. 5 is a block diagram of a second embodiment of the optical disc apparatus according to the present invention.

Referring to FIG. 5, the configuration of an optical disc apparatus 23 according to the present invention will be described. In the optical disc apparatus 23 shown in FIG. 5, the same components as those of the optical disc apparatus 1 shown in FIG. 1 are respectively given, and the same reference numerals and the description thereof is omitted.

The optical disc apparatus 23 shown in FIG. 5 is configured to be provided with the memory 6 inside an optical pickup unit 24. By providing the memory 6 inside the optical pickup unit 24 in this manner, reduction of costs and an easier circuit arrangement for the manufacture of the optical disc apparatus 23 can be facilitated when, for example, the optical pickup unit 24 and the optical disc apparatus 23 having a configuration excluding the optical pickup unit 24 each are separately manufactured. The precision of the positioning of the photo detector 11 does not need to be strict and may be realized by rough adjustment during the manufacturing process of the optical pickup unit 24. Because, in the optical disc apparatus 23, the gains are obtained by a calculating process such that the control signals from the first operational amplifiers 17A to 17D are equated with the control signals obtained when the reflected light beam is radiated evenly to the light-receiving faces A to D. As a result, in the manufacture of the optical pickup unit 24, reduction of costs and reduction of the complexity of the positioning of the photo detector 11 can be facilitated. The operation of the optical disc apparatus 23 is the same as that of the first embodiment described above.

Third Embodiment

Entire Configuration of Optical Disc Apparatus 25

Figure 6:
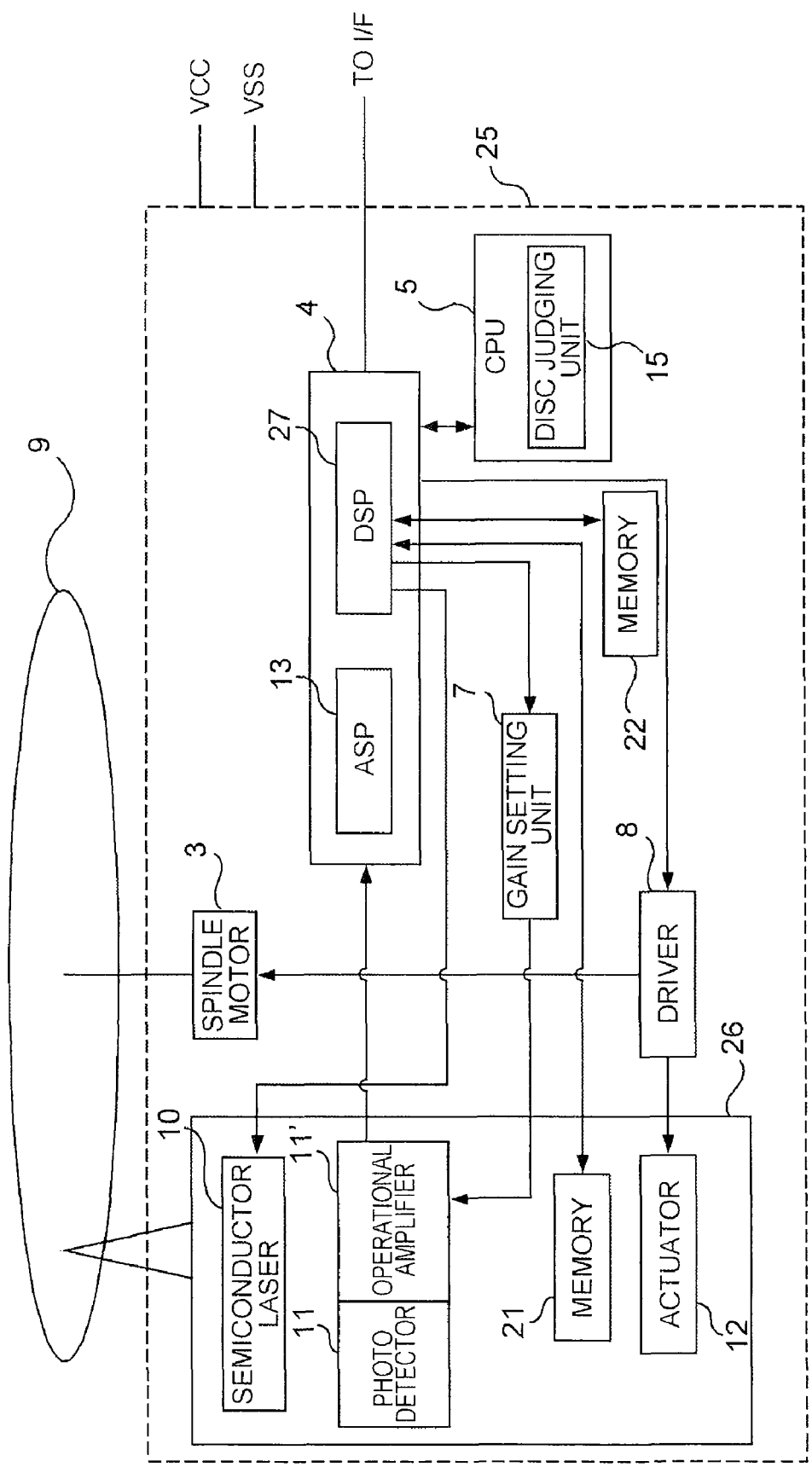
FIG. 6 is a block diagram of a third embodiment of the optical disc apparatus according to the present invention.

Referring to FIG. 6, the configuration of an optical disc apparatus 25 according to the present invention will be described. In the optical disc apparatus 25 shown in FIG. 6, the same components as those of the optical disc apparatus 1 shown in FIG. 1 are respectively given, and the same reference numerals and the description thereof is omitted.

The optical pickup unit 26 has a memory 21 (a first storage unit). For example, a case is present where respective manufacturers of the optical pickup unit 26 and the optical disc apparatus 25 are different. In this case, the manufacturer of the optical pickup unit 26 may incorporate the optical pickup unit 26 into an optical disc apparatus having the same configuration as that of the optical disc apparatus 25 (or the optical disc apparatus 1) to detect the characteristics of the performance of the optical pickup unit 26 during the manufacturing process. The memory 21 stores the initial gain data that indicates the gains to be set in the first operational amplifiers 17A and 17D based on the control signals A' to D' detected on the side of the manufacturer that manufactures the optical pickup unit 26.

The optical disc apparatus 25 has a memory 22 (a second storage unit). The memory 22 stores in advance the initial data and the second gain data described in the first embodiment, and a plurality of gain correcting data that indicate a plurality of gains each having a different value to be set in the fist operational amplifiers 17A to 17D. The embodiment will be described below assuming that the memory 22 stores in advance the first gain correcting data and the second gain correcting data. Referring to FIG. 2, the first gain correcting data, the second gain correcting data, and the initial gain data stored in the memory 21 will be described. The initial gain data is assumed to indicate gains to be set in the first operational amplifiers 17A to 17D to adjust the control signals from the first operational amplifiers 17A to 17D obtained when the reflected light beam that should be radiated as indicated by the dotted line is slightly displaced in the X direction or Y direction (however, this displacement is significantly smaller than that of the reflected light beam indicated by the solid line) during the manufacturing process of the optical pickup unit 26 to the control signals obtained when the reflected light beams is evenly applied to the light-receiving faces A to D. The first gain correcting data is assumed to indicate gains to be set in the first operational amplifiers 17A to 17D to adjust the control signals from the first operational amplifiers 17A to 17D obtained when the displacement of the reflected light beam in the X direction or Y direction is larger than that in the initial gain data described above and is smaller than that of the reflected light beam indicated by the solid line to the control signals obtained when the reflected light beams is evenly applied to the light-receiving faces A to D. The second gain correcting data is assumed to indicate gains to be set in the first operational amplifiers 17A to 17D to adjust the control signals from the first operational amplifiers 17A to 17D obtained when the displacement of the reflected light beam in the X direction or Y direction is the displacement of the reflected light beam indicated by the solid line to the control signals obtained when the reflected light beams is evenly applied to the light-receiving faces A to D.

Operation of Optical Disc Apparatus 25

Figure 7:
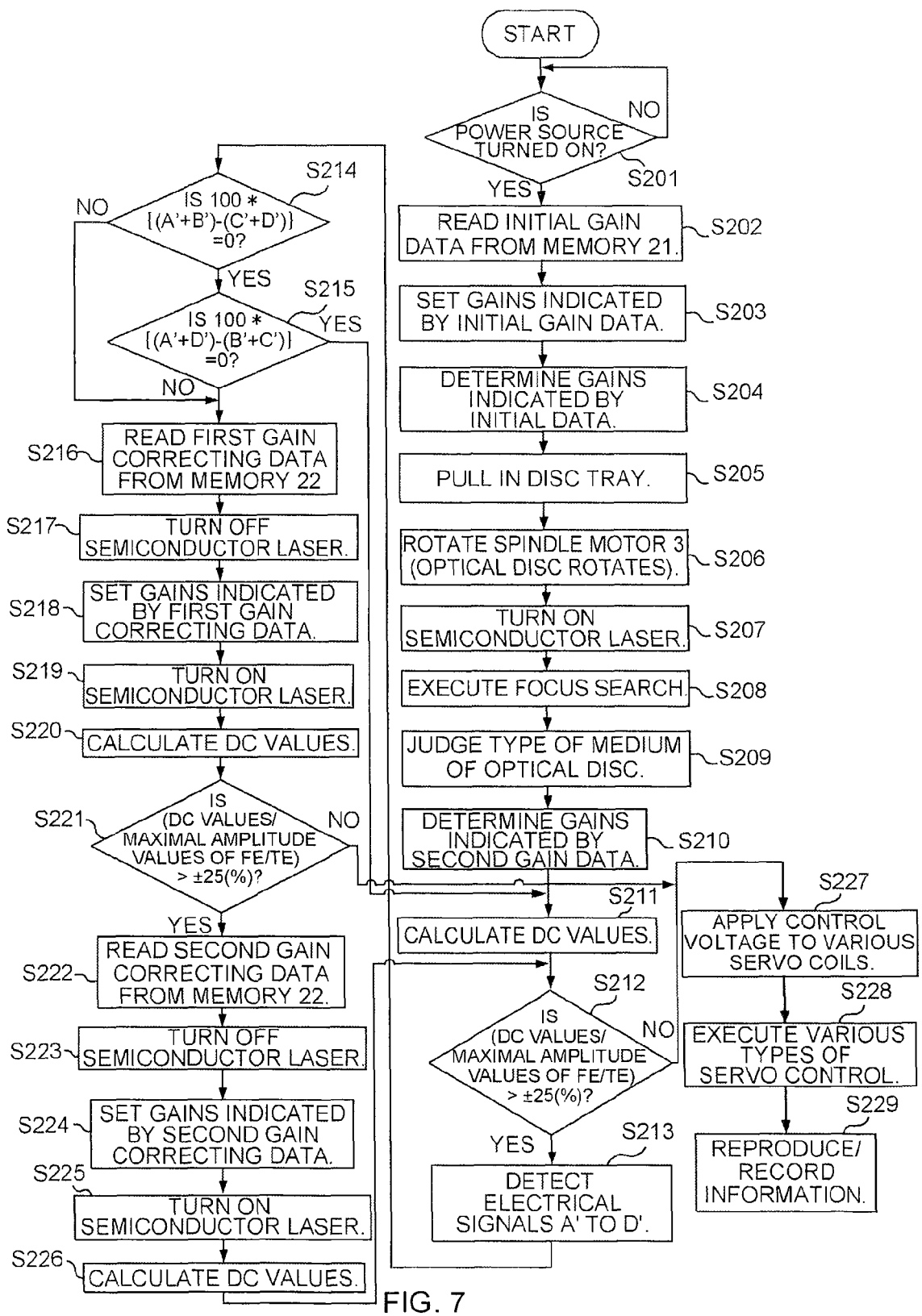
FIG. 7 is a flowchart of an example of the operation of the optical disc apparatus according to the present invention in the third embodiment.

Referring to FIG. 7, the operation of the optical disc apparatus 25 according to the present invention will be described. FIG. 7 is a flowchart of an example of the operation of the optical disc apparatus 25 according to the present invention. Because S201, S204 to S215, and S227 to S229 are respectively the same as S101, S104 to S115, and S123 to S125, illustrated in FIG. 4 and described in the first embodiment, detailed description therefor is omitted.

When a DSP 27 detects turning on of the power source voltage to the optical disc apparatus 25 (S201•YES), the DSP 27 reads the initial gain data from the memory 21 (S202), and transmits the data to the gain setting unit 7. The gain setting unit 7 transmits a signal to the switching circuits 19AA to 19AN to set a gain indicated by the initial gain data to the first operational amplifiers 17A. Similarly, the gain setting unit 7 transmits a signal to the switching circuits 19BA to 19BN to set a gain indicated by the initial gain data to the first operational amplifiers 17B. Similarly, the gain setting unit 7 transmits a signal to the switching circuits 19CA to 19CN to set a gain indicated by the initial gain data to the first operational amplifiers 17C. Similarly, the gain setting unit 7 transmits a signal to the switching circuits 19DA to 19DN to set a gain indicated by the initial gain data to the first operational amplifiers 17D. The switching circuits 19AA to 19AN selected based on the signal from the gain setting unit 7 are turned on. Similarly, the switching circuits 19BA to 19BN selected based on the signal from the gain setting unit 7 are turned on. Similarly, the switching circuits 19CA to 19CN selected based on the signal from the gain setting unit 7 are turned on. Similarly, the switching circuits 19DA to 19DN selected based on the signal from the gain setting unit 7 are turned on. As a result, the selective resistance value of the feedback resistors 20AA to 20AN connected with the switching circuits 19AA to 19AN selectively turned on is set as the gain of the first operational amplifier 17A. That is, the gain indicated by the initial gain data is set to the first operational amplifier 17A. Similarly, the selective resistance value of the feedback resistors 20BA to 20BN connected with the switching circuits 19BA to 19BN selectively turned on is set as the gain of the first operational amplifier 17B. That is, the gain indicated by the initial gain data is set to the first operational amplifier 17B. Similarly, the selective resistance value of the feedback resistors 20CA to 20CN connected with the switching circuits 19CA to 19CN selectively turned on is set as the gain of the first operational amplifier 17C. That is, the gain indicated by the initial gain data is set to the first operational amplifier 17C. Similarly, the selective resistance value of the feedback resistors 20DA to 20DN connected with the switching circuits 19DA to 19DN selectively turned on is set as the gain of the first operational amplifier 17D. That is, the gain indicated by the initial gain data is set to the first operational amplifier 17D (S203). That is, the gains of the first operational amplifiers 17A to 17D are set based on the initial gain data provided by the manufacturer of the optical pickup unit 26.

When the DSP 27 judges that the percentage of the DC values to the maximal amplitude values of the focusing error signal and the tracking error signal exceeds ±25(%) (S212•YES) and detects displacement of the photo detector 11 (the light-receiving faces A to D) in the X direction or the Y direction (S214•NO, S215•NO), the DSP 27 reads the first gain correcting data from the memory 22 (S216). That the DSP 27 judges that the percentage of the DC values to the maximal amplitude values of the focusing error signal and the tracking error signal exceeds ±25(%) at S212 means that the displacement of the photo detector 11 (the light-receiving faces A to D) after the optical pickup unit 26 has been incorporated into the optical disc apparatus 25 is larger than the displacement of the photo detector 11 (the light-receiving faces A to D) during the manufacturing process of the optical pickup unit 26 due to variation over time. The radiation of the laser light beam of the semiconductor laser 10 is stopped (S217) and the gains indicated by the first gain correcting data is set by the gain setting unit 7 to the first operational amplifiers 17A to 17D (S218). The laser light beam is again radiated from the semiconductor laser 10 to the optical disc 9 (S219) and the DC values are calculated (S220).

The DSP 27 judges whether the percentage of the DC values to the maximal amplitude values of the focusing error signal and the tracking error signal exceeds ±25(%) when the gains indicated by the first gain correcting data are set to the first operational amplifiers 17A to 17D (S221). When the DSP 27 judges that the percentage of the DC values to the maximal amplitude values exceeds ±25(%) (S221•YES), the DSP 27 reads the second gain correcting data from the memory 22 (S222). The radiation of the laser light beam of the semiconductor laser 10 is stopped (S223) and the gains indicated by the second gain correcting data are set by the gain setting unit 7 to the first operational amplifiers 17A to 17D (S224). The laser light beam is again radiated from the semiconductor laser 10 to the optical disc 9 (S225) and the DC values are calculated (S226). The procedure is advanced to the process at S212. As described above, the second gain correcting data indicates the gains to be set to the first operational amplifiers 17A to 17D to adjust the control signals from the first operational amplifiers 17A to 17D when the displacement of the reflected light beam in the X direction or the Y direction is the displacement of the reflected light beam indicated by the solid line of FIG. 2 to the control signals obtained when the reflected light beam is radiated evenly to the light-receiving faces A to D. As a result, the DSP 27 judges that the percentage of the DC values to the maximal amplitude values of the focusing error signal and the tracking error signal does not exceed ±25(%) (S212•NO) and the procedure is advanced to S227.

According to the above, the gains of the first operational amplifiers 17A to 17D are set to adjust the control signals to those obtained when the reflected light beam is radiated evenly to the light-receiving faces A to D using the two gain correcting data that are the first gain correcting data and the second gain correcting data, however, the adjustment is not intended to be limited to this. The memory 22 may be provided storing more gain correcting data to cope with larger displacement of the reflected light beam to the light-receiving faces A to D.

According to the above, the optical disc apparatus 25 sets the gains of the first operational amplifiers 17A to 17D one after another from the first gain correcting data, however, the setting is not intended to be limited to this. For example, in the previous process of the optical disc apparatus 25, the gain correcting data obtained when the procedures is advanced to S227 is detected and, in the next process of the optical disc apparatus 25, the gain indicated by the gain correcting data may be provided to be first set to the first operational amplifiers 17A to 17D. As a result, the processing load of the optical disc apparatus 25 can be reduced and recording/reproducing of information to/from the optical disc 9 can be executed quickly.

According to the embodiment described above, for example, when respective manufacturers of the optical pickup unit 26 and the optical disc apparatus 25 are different, the manufacturer of the optical disc apparatus 25 can obtain through the memory 21 the information on the gains to be set to the first operational amplifiers 17A to 17D at the time when the optical pickup unit 26 is manufactured. As a result, when no displacement of the photo detector 11 (the light-receiving faces A to D) is generated after the optical pickup unit 26 is incorporated into the optical disc apparatus 25, processes for recording/reproducing of information to/from the optical disc 9 in the optical disc apparatus 25 can be executed quickly. The load of detecting the displacement of the photo detector 11 (the light-receiving faces A to D) on the side of manufacturer of the optical disc apparatus 25 can be reduced. The precision of the positioning of the photo detector 11 does not need to be strict and may be realized by rough adjustment during the manufacturing process of the optical pickup unit 26. Because, in the optical disc apparatus 1, the gains are obtained by a calculating process such that the control signals from the first operational amplifiers 17A to 17D are equated with the control signals obtained when the reflected light beam is radiated evenly to the light-receiving faces A to D. As a result, in the manufacture of the optical pickup unit 26, reduction of costs and reduction of the complexity of the positioning of the photo detector 11 can be facilitated.

According to the second embodiment and the third embodiment described above, the optical pickup unit 24 (26) can be provided for which the gain of the first operational amplifiers 17A to 17D based on the first gain data (for example, the initial gain data detected by the manufacturer that provides the optical pickup unit 24 (26)) read from the memory 6 (21) such that the values of the gains of the first operational amplifiers 17A to 17D are equated with the values obtained when the reflected light beam is radiated evenly to the light-receiving 17A to 17D can be adjusted to the signals for which the influence of the displacement of the photo detector 11 (the light-receiving faces A to D) is prevented (or reduced). The focus servo and the track servo can be successfully executed based on the control signals. The precision of the positioning of the photo detector 11 does not need to be strict and may be realized by rough adjustment during the manufacturing process of the optical pickup unit 24 (26). Because, in the optical disc apparatus 23 (25) applicable with the optical pickup unit 24 (26), the gains are obtained by a calculating process such that the control signals from the first operational amplifiers 17A to 17D are equated with the control signals obtained when the reflected light beam is radiated evenly to the light-receiving faces A to D. As a result, in the manufacture of the optical pickup unit 24 (26), reduction of costs and reduction of the complexity of the positioning of the photo detector 11 can be facilitated.

Fourth Embodiment

Figure 8:
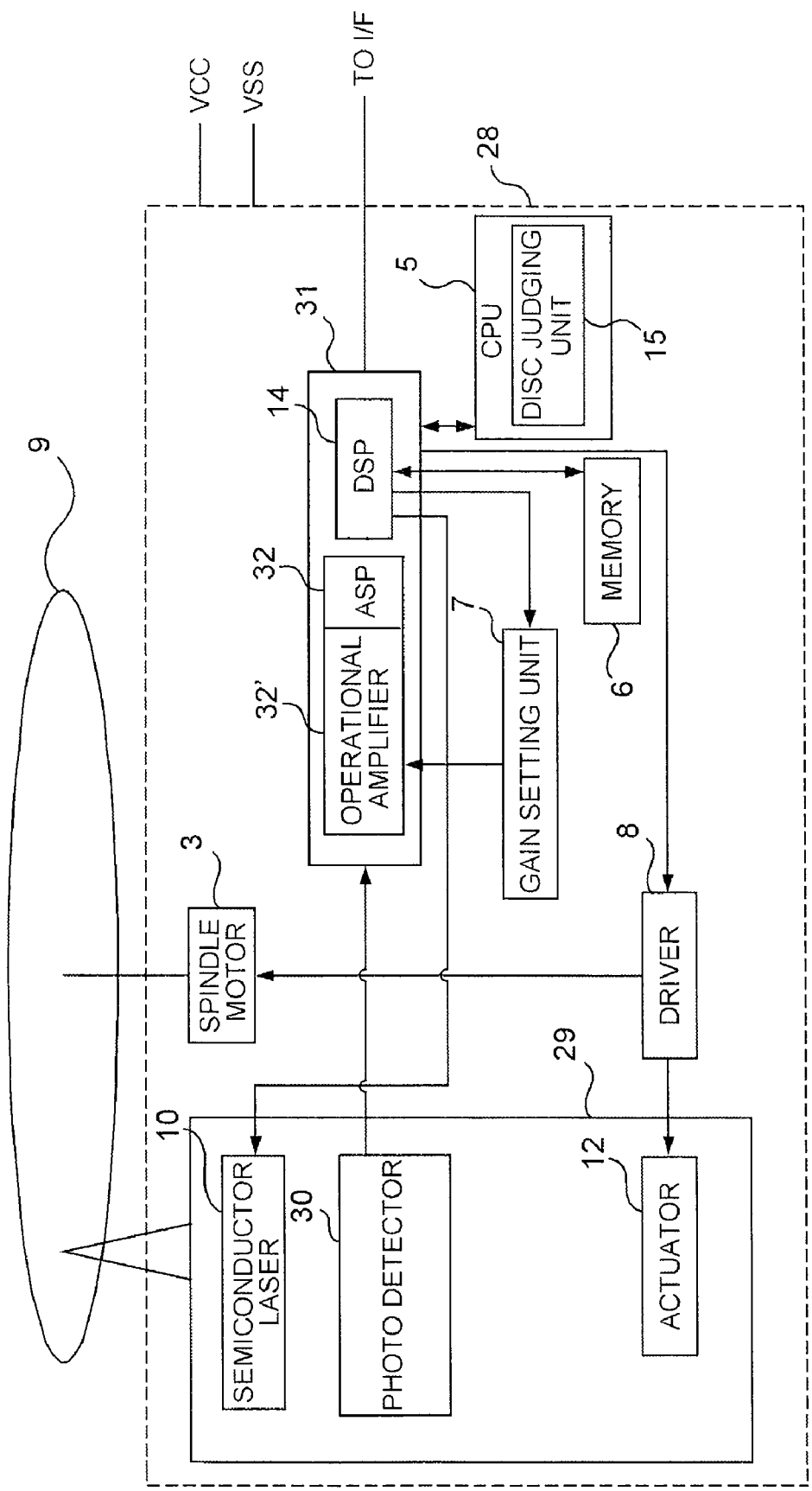
FIG. 8 is a block diagram of a fourth embodiment of the optical disc apparatus of the present invention.

Referring to FIG. 8, the configuration of an optical disc apparatus 28 according to the present invention will be described. In the optical disc apparatus 28 shown in FIG. 8, the same components as those of the optical disc apparatus 1 shown in FIG. 1 are respectively given, and the same reference numerals and the description thereof is omitted.

In the first embodiment to the third embodiment, an operational amplifier 11' (the first operational amplifiers 17A to 17D and the second operational amplifiers 18A to 18D) is provided inside the optical pickup unit 2 (24, 26), however, the configuration is not intended to be limited to this. The operational amplifier 11' may be configured to be provided outside the optical pickup unit. An example can be the optical disc apparatus 28 shown in FIG. 8 to which an operational amplifier 32' (the first operational amplifiers 17A to 17D and the second operational amplifiers 18A to 18D) is provided being integrated with an ASP 32 of a signal processing unit 31. That is, positions at which the first operational amplifiers 17A to 17D and the second operational amplifiers 18A to 18D are provided may be any positions between the output of the photo detector 11 (30) and the input of the ASP 13 (32). In the optical disc apparatus 28 shown in FIG. 8, currents (photoelectric converted signals) are provided to the ASP 32, respectively corresponding to the levels of the reflected light beam created by the photodiodes 16A to 16D constituting the photo detector 30 described above. The first operational amplifying circuits 17A to 17D of the ASP 32 create voltages respectively corresponding to the currents according to the products respectively of the currents from the photo detector 30 and the selective resistance values. The first operational amplifiers 17A to 17D outputs to the second operational amplifiers 18A to 18D the control signals formed by amplifying the differences respectively between the reference voltage Vref of the non-inverting input terminals and the voltages of the inverting input terminals by gains determined by the selective resistance values. The operation after this is the same as that in the embodiments described above.

According to the embodiment, reduction of costs and an easier circuit arrangement, etc. for the manufacture of the optical pickup unit 29 can be facilitated when, for example, the optical pickup unit 29 and the optical disc apparatus 28 having a configuration excluding the optical pickup unit 29 each are separately manufactured. The precision of the positioning of the photo detector 30 does not need to be strict and may be realized by rough adjustment during the manufacturing process of the optical pickup unit 29. Because, in the optical disc apparatus 28, the gains are obtained by a calculating process such that the control signals of the first operational amplifiers 17A to 17D based on the currents from the photo detector 30 are equated with the control signals obtained when the reflected light beam is radiated evenly to the light-receiving faces A to D. As a result, in the manufacture of the optical pickup unit 29, reduction of costs and reduction of the complexity of the positioning of the photo detector 30 can be facilitated.

Though the embodiments of the present invention have been described, the embodiments described above are for facilitating the understanding of the present invention and is not for limiting the present invention in construing. The present invention may be varied/modified without departing from the scope thereof and encompasses equivalents thereof.

It is claimed:

1. An optical disc apparatus comprising:
an optical pickup unit having
a semiconductor laser that radiates a laser light beam which is to be applied to an optical disc,
a photo detector that
has a plurality of light-receiving faces, which are disposed adjacent to each other, and each of which is disposed radially at an identical radial angle from a center of all of the plurality of light-receiving faces, and that,
when the plurality of light-receiving faces receive a reflected light beam of the laser light beam applied to the optical disc, outputs photoelectric converted signals, each of which corresponds to a level of the reflected light beam at each of the plurality of light-receiving faces,
a plurality of operational amplifiers that respectively output control signals for focus servo or track servo to the optical disc, based on the photoelectric converted signals, and
an actuator that executes the focus servo or the track servo, based on the control signals;
a driving unit that drives the actuator to execute the focus servo or the track servo, based on the control signals;
a storage unit in which gain data is stored, the gain data being data for setting gains of the plurality of operational amplifiers; and
a gain setting unit that adjusts gains of the plurality of operational amplifiers such that the gains have values equivalent to that the reflected light beam is evenly applied to the plurality of light-receiving faces, based on the gain data read from the storage unit,
wherein initial gain data is stored in the storage unit, the initial gain data being data for setting initial gains of the plurality of operational amplifiers, and
wherein the gain setting unit calculates gain data of the plurality of operational amplifiers such that gains of the plurality of operational amplifiers have values equivalent to that the reflected light beam is evenly applied to the plurality of light-receiving faces, based on the control signals obtained when the initial gains are set for the plurality of operational amplifiers, and wherein the gain setting unit calculates the gain data of the plurality of operational amplifiers when a difference between a DC value superimposed on the control signals and a reference DC value is equal to or larger than a predetermined value.

2. The optical disc apparatus of claim 1, wherein the storage unit is provided outside of the optical pickup unit.

3. The optical disc apparatus of claim 1, comprising
a writing unit that causes the gain data, calculated by the gain setting unit, of the plurality of operational amplifiers to be stored in the storage unit as the initial gain data.

4. The optical disc apparatus of claim 1, wherein
the gain setting unit also calculates the gain data of the plurality of operational amplifiers when the optical apparatus is energized.

5. An optical disc apparatus comprising:
an optical pickup unit having
a semiconductor laser that radiates a laser light beam which is to be applied to an optical disc,
a photo detector that
has a plurality of light-receiving faces, which are disposed adjacent to each other, and each of which is disposed radially at an identical radial angle from a center of all of the plurality of light-receiving faces, and that,
when the plurality of light-receiving faces receive a reflected light beam of the laser light beam applied to the optical disc, outputs photoelectric converted signals, each of which corresponds to a level of the reflected light beam at each of the plurality of light-receiving faces;
a plurality of operational amplifiers that respectively output control signals for focus servo or track servo to the optical disc, based on the photoelectric converted signals, and
an actuator that executes the focus servo or the track servo, based on the control signals;
a driving unit that drives the actuator to execute the focus servo or the track servo, based on the control signals;
a first storage unit inside the optical pickup unit, in which initial gain data is stored, the initial gain data being data for setting initial gains of the plurality of operational amplifiers;
a second storage unit outside the optical pickup unit, in which adjusting gain data is stored, the adjusting gain data being data for adjusting gains of the plurality of operational amplifiers; and
a gain setting unit that adjusts gains of the plurality of operational amplifiers with use of the adjusting gain data read from the second storage unit, such that the gains have values equivalent to that the reflected light beam is evenly applied to the plurality of light-receiving faces, based on the control signals obtained when initial gains of the plurality of operational amplifiers are set with use of the initial gain data read from the first storage unit.

6. An optical disc apparatus comprising:
an optical pickup unit having
a semiconductor laser that radiates a laser light beam which is to be applied to an optical disc,
a photo detector that
has a plurality of light-receiving faces, which are disposed adjacent to each other, and each of which is disposed radially at an identical radial angle from a center of all of the plurality of light-receiving faces, and that,
when the plurality of light-receiving faces receive a reflected light beam of the laser light beam applied to the optical disc, outputs photoelectric converted signals, each of which corresponds to a level of the reflected light beam at each of the plurality of light-receiving faces, and
an actuator that executes focus servo or track servo to the optical disc;
a plurality of operational amplifiers that respectively output a control signal for causing the actuator to execute the focus servo or the track servo, based on the photoelectric converted signals;
a driving unit that drives the actuator to execute the focus servo or the track servo, based on the control signals;
a storage unit in which gain data is stored, the gain data being data for setting gains of the plurality of operational amplifiers; and
a gain setting unit that adjusts gains of the plurality of operational amplifiers such that the gains have values equivalent to that the reflected light beam is evenly applied to the plurality of light-receiving faces, based on the gain data read from the storage unit,
wherein initial gain data is stored in the storage unit, the initial gain data being data for setting initial gains of the plurality of operational amplifiers, and
wherein the gain setting unit calculates gain data of the plurality of operational amplifiers such that gains of the plurality of operational amplifiers have values equivalent to that the reflected light beam is evenly applied to the plurality of light-receiving faces, based on the control signals obtained when the initial gains are set for the plurality of operational amplifiers, and
wherein the gain setting unit calculates the gain data of the plurality of operational amplifiers when a difference between a DC value superimposed on the control signals and a reference DC value is equal to or larger than a predetermined value.

7. An optical pickup unit comprising:
a semiconductor laser that radiates a laser light beam which is to be applied to an optical disc;
a photo detector that
has a plurality of light-receiving faces, which are disposed adjacent to each other, and each of which is disposed radially at an identical radial angle from a center of all of the plurality of light-receiving faces, and that,
when the plurality of light-receiving faces receive a reflected light beam of the laser light beam applied to the optical disc, outputs photoelectric converted signals, each of which corresponds to a level of the reflected light beam at each of the plurality of light-receiving faces;
a plurality of operational amplifiers that respectively output control signals for focus servo or track servo to the optical disc, based on the photoelectric converted signals;
an actuator that executes the focus servo or the track servo, based on the control signals; and
a storage unit in which initial gain data is stored, the initial gain data being data for setting initial gains of the plurality of operational amplifiers,
wherein a gain setting unit calculates gain data of the plurality of operational amplifiers such that gains of the plurality of operational amplifiers have values equivalent to that the reflected light beam is evenly applied to the plurality of light-receiving faces, based on the control signals obtained when the initial gains are set for the plurality of operational amplifiers, and wherein the gain setting unit calculates the gain data of the plurality of operational amplifiers when a difference between a DC value superimposed on the control signals and a reference DC value is equal to or larger than a predetermined value.

* * * * *